(12) United States Patent
Arima et al.

(10) Patent No.: US 7,545,460 B2
(45) Date of Patent: Jun. 9, 2009

(54) LIQUID CRYSTAL DISPLAY, OPTICAL SHEET MANUFACTURING METHOD, AND OPTICAL SHEET

(75) Inventors: Mitsuo Arima, Miyagi (JP); Jun Shimizu, Miyagi (JP); Kei Obata, Miyagi (JP); Eiji Oota, Miyagi (JP); Toru Abiko, Miyagi (JP); Yasuyuki Kudo, Miyagi (JP); Masato Ishigaki, Miyagi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 11/659,010

(22) PCT Filed: Apr. 5, 2006

(86) PCT No.: PCT/JP2006/307227

§ 371 (c)(1),
(2), (4) Date: Dec. 10, 2007

(87) PCT Pub. No.: WO2006/129418

PCT Pub. Date: Dec. 7, 2006

(65) Prior Publication Data

US 2008/0316392 A1    Dec. 25, 2008

(51) Int. Cl.
*G02F 1/1335* (2006.01)
*F21V 7/04* (2006.01)

(52) U.S. Cl. .............................. 349/64; 349/61; 349/62; 362/606; 362/607

(58) Field of Classification Search .................... 349/64
See application file for complete search history.

(56) References Cited

U.S. PATENT DOCUMENTS 6,590,625 B1 * 7/2003 Umemoto et al. ............. 349/65

(Continued)

FOREIGN PATENT DOCUMENTS

JP    6-102506    4/1994

(Continued)

OTHER PUBLICATIONS

Office Action issued by the Japanese Patent Office on May 18, 2007 for corresponding Japanese Patent Application No. 2006-102260.

*Primary Examiner*—David Nelms
*Assistant Examiner*—W. Patty Chen
(74) *Attorney, Agent, or Firm*—K&L Gates LLP

(57) ABSTRACT

A liquid crystal display, optical sheet manufacturing method, and an optical sheet are provided. The occurrence of moiré is prevented while suppressing a reduction in front luminance. The liquid crystal display includes: a liquid crystal display panel; a light source arranged on a back surface side of the liquid crystal display panel; an optical sheet with a light-condensing property arranged between the liquid crystal display panel and the light source, the optical sheet having a number of irregularities arranged continuously on a principal surface of the optical sheet; and a diffuser sheet arranged between the liquid crystal display panel and the optical sheet. The liquid crystal display is constructed so that when an arrangement pitch of the irregularities of the optical sheet is P [μm], a haze value of the diffuser sheet is H [%], a total light transmittance of the diffuser sheet is Tt [%], and a pixel pitch of the liquid crystal display panel is Pp [μm], the following relationship is satisfied: $(H/Tt) \cdot (Pp/P) \geq 1.6$.

25 Claims, 29 Drawing Sheets

U.S. PATENT DOCUMENTS

2007/0242184 A1* 10/2007 Ohta et al. .................. 349/64
2008/0259243 A1* 10/2008 Ohta et al. .................. 349/64

FOREIGN PATENT DOCUMENTS

| JP | 07-198911 | 8/1995 |
| JP | 10-160914 | 6/1998 |
| JP | 11-352900 | 12/1999 |
| JP | 2000-330107 | 11/2000 |
| JP | 2001-13878 | 1/2001 |
| JP | 2004-006128 | 1/2004 |
| JP | 2005-300775 | 10/2005 |
| JP | 2006-078737 | 3/2006 |

* cited by examiner

FIG. 2
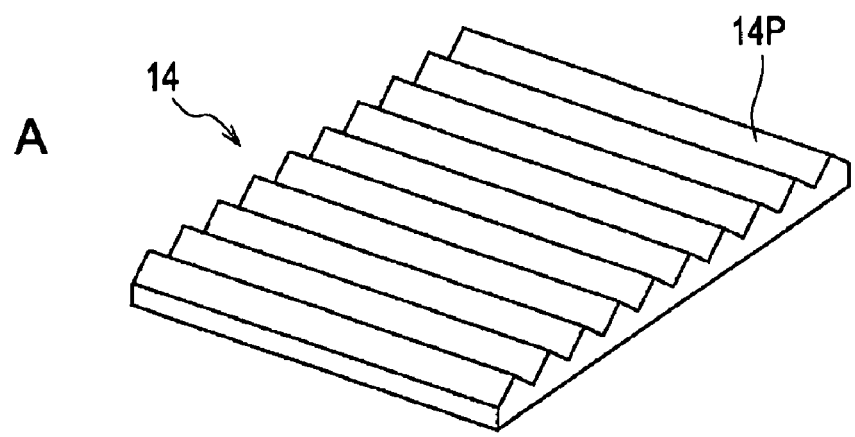
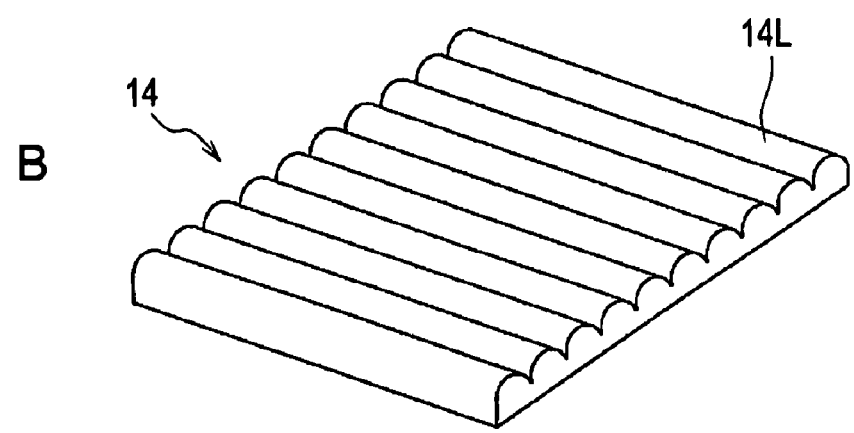
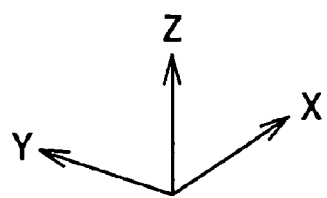

$$L1: Z = \frac{X^2}{25 + \sqrt{625 + 10X^2}} + 5 \times 10^{-5} X^4$$

$$L2: Z = \frac{X^2}{20 + \sqrt{400 + 20X^2}} + 6 \times 10^{-5} X^4$$

$$L3: Z = \frac{X^2}{10 + \sqrt{100 + 40X^2}} + 6 \times 10^{-5} X^4$$

FIG. 9
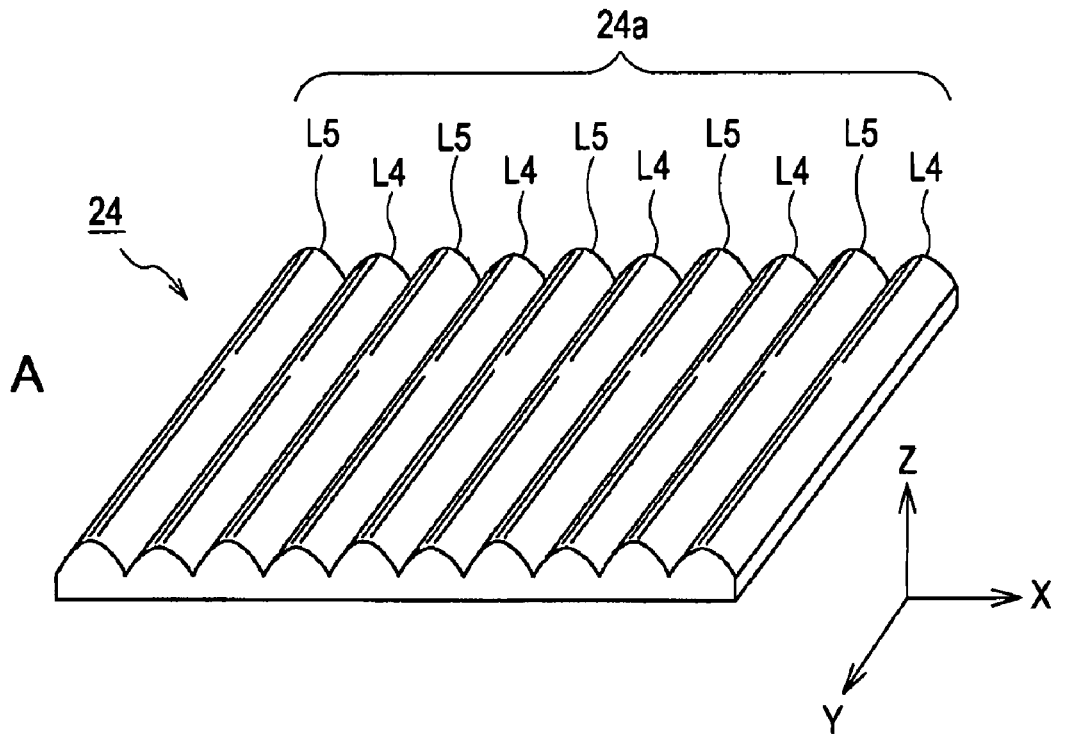
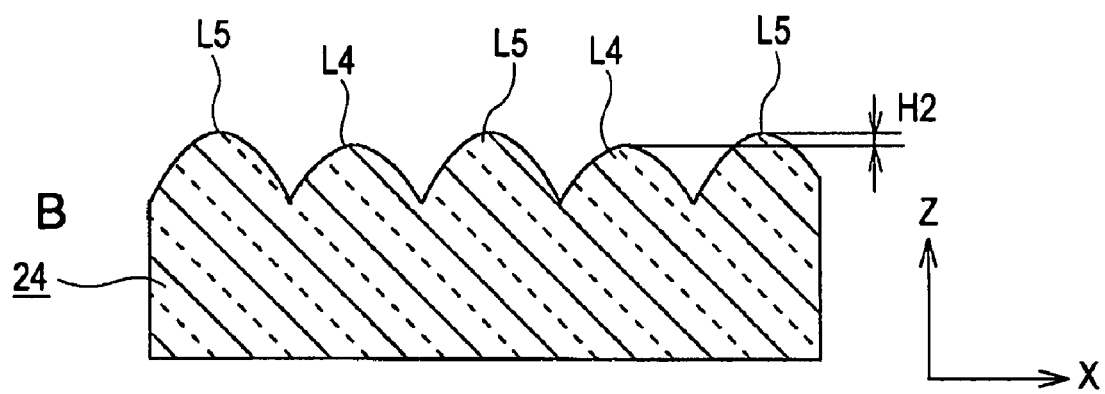
$$L4: Z = \frac{X^2}{10+\sqrt{100+X^2}} + 10^{-5}X^4$$
$$L5: Z = \frac{X^2}{10+\sqrt{100+0.8X^2}} + 1.75 \times 10^{-5}X^4$$

$$L6: Z = \frac{X^2}{1+\sqrt{1+X^2}} + 10^{-5}X^4$$

$$L7: Z = \frac{X^2}{5+\sqrt{25+X^2}}$$

FIG. 11
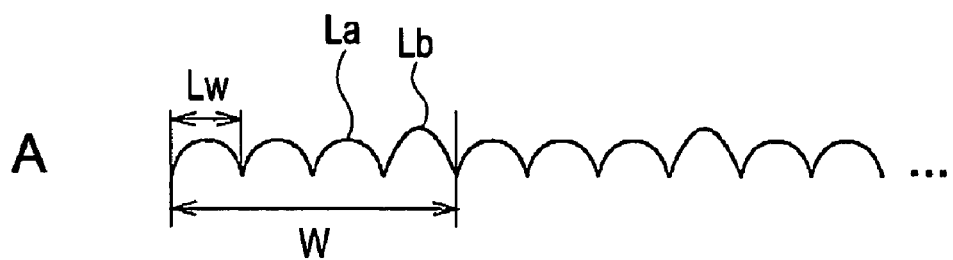
A
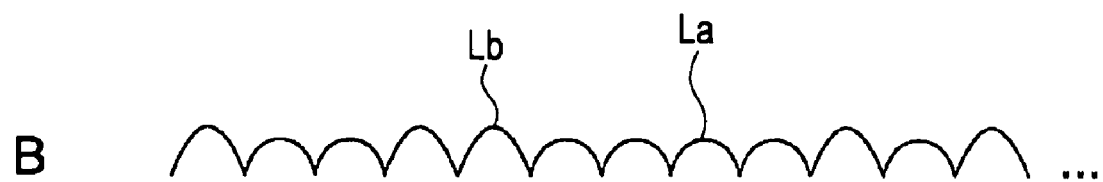
B

FIG. 13

| SAMPLE | HAZE (%) | δa (rad) | FRONT LUMINANCE RELATIVE VALUE (%) |
|---|---|---|---|
| S1 | 1 | 0.0023 | 100 |
| S2 | 85.5 | 0.4352 | 68 |
| S3 | 14.9 | 0.0442 | 93 |
| S4 | 13.7 | 0.0733 | 97 |
| S5 | 93.2 | 0.4880 | 65 |
| S6 | 11 | 0.0522 | 97 |
| S7 | 80.7 | 0.3701 | 76 |
| S8 | 35.1 | 0.1067 | 94 |
| S9 | 5.8 | 0.0245 | 99 |
| S10 | 33.6 | 0.1023 | 97 |
| S11 | 22.3 | 0.0738 | 86 |

FIG. 15

BACKWARD SCATTERING MEASUREMENT VALUES

|  | HAZE H (%) | TOTAL LIGHT TRANSMITTANCE Tt (%) | DIFFUSED LIGHT Td (%) | LINEAR TRANSMISSION AMOUNT Tp (%) | H/Tt |
|---|---|---|---|---|---|
| DIFFUSER SHEET 1 | 99.7 | 35.4 | 35.3 | 0.1 | 2.82 |
| DIFFUSER SHEET 2 | 93.7 | 67.1 | 62.9 | 4.2 | 1.40 |
| DIFFUSER SHEET 3 | 95.1 | 68.3 | 65 | 3.3 | 1.39 |
| DIFFUSER SHEET 4 | 91 | 66.1 | 60.2 | 5.9 | 1.38 |
| DIFFUSER SHEET 5 | 95.2 | 71.1 | 67.6 | 3.5 | 1.34 |
| DIFFUSER SHEET 6 | 74.6 | 59.4 | 44.3 | 15.1 | 1.26 |
| DIFFUSER SHEET 7 | 90.1 | 89.4 | 80.6 | 8.8 | 1.01 |
| DIFFUSER SHEET 8 | 83.7 | 90.7 | 75.9 | 14.8 | 0.92 |
| DIFFUSER SHEET 9 | 60.1 | 90 | 54.1 | 35.9 | 0.67 |
| DIFFUSER SHEET 10 | 33.6 | 89.8 | 30.2 | 59.6 | 0.37 |
| ADHESIVE DIFFUSING AGENT 1 | 94.7 | 67.2 | 63.6 | 3.6 | 1.41 |
| ADHESIVE DIFFUSING AGENT 2 | 89.9 | 88.6 | 76.7 | 11.9 | 1.01 |
| ADHESIVE DIFFUSING AGENT 3 | 34.5 | 87.8 | 30.3 | 57.5 | 0.39 |
| DBEFD | 82.2 | 47.2 | 38.8 | 8.4 | 1.74 |

FIG. 16

FORWARD SCATTERING MEASUREMENT VALUES

|  | HAZE H (%) | TOTAL LIGHT TRANSMITTANCE Tt (%) | DIFFUSED LIGHT Td (%) | LINEAR TRANSMISSION AMOUNT Tp (%) | H/Tt | HAZE (FORWARD SCATTERING − BACKWARD SCATTERING) (%) |
|---|---|---|---|---|---|---|
| DIFFUSER SHEET 1 | 99.6 | 34.7 | 34.6 | 0.1 | 2.87 | −0.1 |
| DIFFUSER SHEET 2 | 95.5 | 92.4 | 88.2 | 4.2 | 1.03 | 1.8 |
| DIFFUSER SHEET 3 | 96.4 | 93.4 | 90 | 3.4 | 1.03 | 1 |
| DIFFUSER SHEET 4 | 93.5 | 92.6 | 86.6 | 6.0 | 1.01 | 1.3 |
| DIFFUSER SHEET 5 | 96.2 | 93.1 | 89.5 | 3.6 | 1.03 | 2.5 |
| DIFFUSER SHEET 6 | 83.7 | 91.5 | 76.6 | 14.9 | 0.91 | −6.8 |
| DIFFUSER SHEET 7 | 90 | 91 | 81.9 | 9.1 | 0.99 | 0 |
| DIFFUSER SHEET 8 | 83.3 | 90.6 | 75.5 | 15.1 | 0.92 | 15.4 |
| DIFFUSER SHEET 9 | 59.9 | 89.8 | 53.8 | 36.0 | 0.67 | −0.2 |
| DIFFUSER SHEET 10 | 33.7 | 92.3 | 31.1 | 61.2 | 0.37 | 0.1 |
| ADHESIVE DIFFUSING AGENT 1 | 94.7 | 67.2 | 63.6 | 3.6 | 1.41 | 0 |
| ADHESIVE DIFFUSING AGENT 2 | 89.9 | 88.6 | 76.7 | 11.9 | 1.01 | 0 |
| ADHESIVE DIFFUSING AGENT 3 | 34.5 | 87.8 | 30.3 | 57.5 | 0.39 | 0 |
| DBEFD | 82.2 | 47.2 | 38.8 | 8.4 | 1.74 | 0 |

FIG. 17

| | FILM/DIFFUSION LAYER KIND | P (μm) | Pp/P (-) | (H/Tt)*(Pp/P) | MOIRÉ EVALUATION |
|---|---|---|---|---|---|
| SAMPLE 1-1 | DIFFUSER SHEET 1 | 50 | 6.4 | 18.02 | ○ |
| SAMPLE 1-2 | DIFFUSER SHEET 2 | | | 8.94 | ○ |
| SAMPLE 1-3 | DIFFUSER SHEET 3 | | | 8.91 | ○ |
| SAMPLE 1-4 | DIFFUSER SHEET 4 | | | 8.81 | ○ |
| SAMPLE 1-5 | DIFFUSER SHEET 5 | | | 8.57 | ○ |
| SAMPLE 1-6 | DIFFUSER SHEET 6 | | | 8.04 | ○ |
| SAMPLE 1-7 | DIFFUSER SHEET 7 | | | 6.45 | ○ |
| SAMPLE 1-8 | DIFFUSER SHEET 8 | | | 5.91 | ○ |
| SAMPLE 1-9 | DIFFUSER SHEET 9 | | | 4.27 | ○ |
| SAMPLE 1-10 | DIFFUSER SHEET 10 | | | 2.39 | ○ |
| SAMPLE 1-11 | ADHESIVE DIFFUSION LAYER 1 | | | 9.02 | ○ |
| SAMPLE 1-12 | ADHESIVE DIFFUSION LAYER 2 | | | 6.49 | ○ |
| SAMPLE 1-13 | ADHESIVE DIFFUSION LAYER 3 | | | 2.51 | ○ |
| SAMPLE 1-14 | DIFFUSER SHEET 2 | 32 | 10 | 8.94 | ○ |
| SAMPLE 1-15 | DIFFUSER SHEET 2 | 15 | 21.3 | 8.94 | ○ |
| SAMPLE 2-1 | DIFFUSER SHEET 1 | 110 | 2.91 | 8.20 | ○ |
| SAMPLE 2-2 | DIFFUSER SHEET 2 | | | 4.06 | ○ |
| SAMPLE 2-3 | DIFFUSER SHEET 3 | | | 4.05 | ○ |
| SAMPLE 2-4 | DIFFUSER SHEET 4 | | | 4.01 | ○ |
| SAMPLE 2-5 | DIFFUSER SHEET 5 | | | 3.90 | ○ |
| SAMPLE 2-6 | DIFFUSER SHEET 6 | | | 3.65 | ○ |
| SAMPLE 2-7 | DIFFUSER SHEET 7 | | | 2.93 | ○ |
| SAMPLE 2-8 | DIFFUSER SHEET 8 | | | 2.69 | ○ |
| SAMPLE 2-9 | DIFFUSER SHEET 9 | | | 1.94 | ○ |
| SAMPLE 2-10 | DIFFUSER SHEET 10 | | | 1.09 | × |
| SAMPLE 2-11 | ADHESIVE DIFFUSION LAYER 1 | | | 4.10 | ○ |
| SAMPLE 2-12 | ADHESIVE DIFFUSION LAYER 2 | | | 2.95 | ○ |
| SAMPLE 2-13 | ADHESIVE DIFFUSION LAYER 3 | | | 1.14 | × |
| SAMPLE 3-1 | DIFFUSER SHEET 1 | 200 | 1.6 | 4.53 | ○ |
| SAMPLE 3-2 | DIFFUSER SHEET 2 | | | 2.25 | ○ |
| SAMPLE 3-3 | DIFFUSER SHEET 3 | | | 2.24 | ○ |
| SAMPLE 3-4 | DIFFUSER SHEET 4 | | | 2.22 | ○ |
| SAMPLE 3-5 | DIFFUSER SHEET 5 | | | 2.16 | ○ |
| SAMPLE 3-6 | DIFFUSER SHEET 6 | | | 2.02 | ○ |
| SAMPLE 3-7 | DIFFUSER SHEET 7 | | | 1.62 | ○ |
| SAMPLE 3-8 | DIFFUSER SHEET 8 | | | 1.49 | × |
| SAMPLE 3-9 | DIFFUSER SHEET 9 | | | 1.08 | × |
| SAMPLE 3-10 | DIFFUSER SHEET 10 | | | 0.60 | × |
| SAMPLE 3-11 | ADHESIVE DIFFUSION LAYER 1 | | | 2.27 | ○ |
| SAMPLE 3-12 | ADHESIVE DIFFUSION LAYER 2 | | | 1.63 | ○ |
| SAMPLE 3-13 | ADHESIVE DIFFUSION LAYER 3 | | | 0.63 | × |
| SAMPLE 4-1 | DIFFUSER SHEET 1 | 350 | 0.91 | 2.56 | ○ |
| SAMPLE 4-2 | DIFFUSER SHEET 2 | | | 1.27 | × |
| SAMPLE 4-3 | DIFFUSER SHEET 3 | | | 1.27 | × |
| SAMPLE 4-4 | DIFFUSER SHEET 4 | | | 1.25 | × |
| SAMPLE 4-5 | DIFFUSER SHEET 5 | | | 1.22 | × |
| SAMPLE 4-6 | DIFFUSER SHEET 6 | | | 1.14 | × |
| SAMPLE 4-7 | DIFFUSER SHEET 7 | | | 0.92 | × |
| SAMPLE 4-8 | DIFFUSER SHEET 8 | | | 0.84 | × |
| SAMPLE 4-9 | DIFFUSER SHEET 9 | | | 0.61 | × |
| SAMPLE 4-10 | DIFFUSER SHEET 10 | | | 0.34 | × |
| SAMPLE 4-11 | ADHESIVE DIFFUSION LAYER 1 | | | 1.28 | × |
| SAMPLE 4-12 | ADHESIVE DIFFUSION LAYER 2 | | | 0.92 | × |
| SAMPLE 4-13 | ADHESIVE DIFFUSION LAYER 3 | | | 0.36 | × |

Pp: PIXEL PITCH   P: WIDTH OF LENS
H: HAZE   T: TOTAL LIGHT TRANSMISSION AMOUNT

FIG. 18

| | FILM/DIFFUSION LAYER KIND | P (μm) | Pp/P (-) | FRONT LUMINANCE RELATIVE VALUE (%) | VIEWING ANGLE (DEGREE) VA h | VIEWING ANGLE (DEGREE) VA v |
|---|---|---|---|---|---|---|
| SAMPLE 1-16 | NONE | | | 100% | 96 | 64 |
| SAMPLE 1-1 | DIFFUSER SHEET 1 | | | 46% | 127 | 129 |
| SAMPLE 1-2 | DIFFUSER SHEET 2 | | | 100% | 77 | 68 |
| SAMPLE 1-3 | DIFFUSER SHEET 3 | | | 97% | 76 | 65 |
| SAMPLE 1-4 | DIFFUSER SHEET 4 | | | 98% | 76 | 68 |
| SAMPLE 1-5 | DIFFUSER SHEET 5 | | | 99% | 77 | 64 |
| SAMPLE 1-6 | DIFFUSER SHEET 6 | 50 | 6.4 | 102% | 82 | 68 |
| SAMPLE 1-7 | DIFFUSER SHEET 7 | | | 98% | 87 | 64 |
| SAMPLE 1-8 | DIFFUSER SHEET 8 | | | 99% | 89 | 64 |
| SAMPLE 1-9 | DIFFUSER SHEET 9 | | | 99% | 93 | 64 |
| SAMPLE 1-10 | DIFFUSER SHEET 10 | | | 100% | 94 | 63 |
| SAMPLE 1-11 | ADHESIVE DIFFUSION LAYER 1 | | | 98% | 74 | 63 |
| SAMPLE 1-12 | ADHESIVE DIFFUSION LAYER 2 | | | 99% | 86 | 62 |
| SAMPLE 1-13 | ADHESIVE DIFFUSION LAYER 3 | | | 100% | 92 | 61 |
| SAMPLE 1-14 | DIFFUSER SHEET 2 | 32 | 10 | 96% | 97 | 66 |
| SAMPLE 1-15 | DIFFUSER SHEET 2 | 15 | 21.3 | 90% | 98 | 68 |
| SAMPLE 2-14 | NONE | | | 100% | 94 | 61 |
| SAMPLE 2-1 | DIFFUSER SHEET 1 | | | 48% | 127 | 127 |
| SAMPLE 2-2 | DIFFUSER SHEET 2 | | | 103% | 76 | 67 |
| SAMPLE 2-3 | DIFFUSER SHEET 3 | | | 100% | 77 | 68 |
| SAMPLE 2-4 | DIFFUSER SHEET 4 | | | 101% | 75 | 68 |
| SAMPLE 2-5 | DIFFUSER SHEET 5 | | | 102% | 78 | 66 |
| SAMPLE 2-6 | DIFFUSER SHEET 6 | 110 | 2.91 | 104% | 82 | 68 |
| SAMPLE 2-7 | DIFFUSER SHEET 7 | | | 101% | 86 | 64 |
| SAMPLE 2-8 | DIFFUSER SHEET 8 | | | 102% | 87 | 62 |
| SAMPLE 2-9 | DIFFUSER SHEET 9 | | | 102% | 91 | 61 |
| SAMPLE 2-10 | DIFFUSER SHEET 10 | | | 103% | 92 | 62 |
| SAMPLE 2-11 | ADHESIVE DIFFUSION LAYER 1 | | | 101% | 75 | 65 |
| SAMPLE 2-12 | ADHESIVE DIFFUSION LAYER 2 | | | 102% | 85 | 63 |
| SAMPLE 2-13 | ADHESIVE DIFFUSION LAYER 3 | | | 102% | 91 | 60 |
| SAMPLE 3-14 | NONE | | | 102% | 95 | 61 |
| SAMPLE 3-1 | DIFFUSER SHEET 1 | | | 51% | 127 | 127 |
| SAMPLE 3-2 | DIFFUSER SHEET 2 | | | 104% | 76 | 67 |
| SAMPLE 3-3 | DIFFUSER SHEET 3 | | | 103% | 77 | 68 |
| SAMPLE 3-4 | DIFFUSER SHEET 4 | | | 103% | 75 | 68 |
| SAMPLE 3-5 | DIFFUSER SHEET 5 | | | 103% | 78 | 66 |
| SAMPLE 3-6 | DIFFUSER SHEET 6 | 200 | 1.6 | 106% | 81 | 68 |
| SAMPLE 3-7 | DIFFUSER SHEET 7 | | | 103% | 86 | 64 |
| SAMPLE 3-8 | DIFFUSER SHEET 8 | | | 103% | 87 | 62 |
| SAMPLE 3-9 | DIFFUSER SHEET 9 | | | 104% | 92 | 61 |
| SAMPLE 3-10 | DIFFUSER SHEET 10 | | | 105% | 92 | 62 |
| SAMPLE 3-11 | ADHESIVE DIFFUSION LAYER 1 | | | 103% | 75 | 66 |
| SAMPLE 3-12 | ADHESIVE DIFFUSION LAYER 2 | | | 104% | 86 | 62 |
| SAMPLE 3-13 | ADHESIVE DIFFUSION LAYER 3 | | | 104% | 90 | 60 |
| SAMPLE 4-14 | NONE | | | 104% | 95 | 63 |
| SAMPLE 4-1 | DIFFUSER SHEET 1 | | | 53% | 127 | 128 |
| SAMPLE 4-2 | DIFFUSER SHEET 2 | | | 105% | 76 | 66 |
| SAMPLE 4-3 | DIFFUSER SHEET 3 | | | 104% | 75 | 65 |
| SAMPLE 4-4 | DIFFUSER SHEET 4 | | | 103% | 74 | 66 |
| SAMPLE 4-5 | DIFFUSER SHEET 5 | | | 104% | 77 | 63 |
| SAMPLE 4-6 | DIFFUSER SHEET 6 | 350 | 0.91 | 108% | 82 | 67 |
| SAMPLE 4-7 | DIFFUSER SHEET 7 | | | 104% | 85 | 63 |
| SAMPLE 4-8 | DIFFUSER SHEET 8 | | | 104% | 88 | 61 |
| SAMPLE 4-9 | DIFFUSER SHEET 9 | | | 105% | 92 | 63 |
| SAMPLE 4-10 | DIFFUSER SHEET 10 | | | 106% | 93 | 63 |
| SAMPLE 4-11 | ADHESIVE DIFFUSION LAYER 1 | | | 104% | 74 | 64 |
| SAMPLE 4-12 | ADHESIVE DIFFUSION LAYER 2 | | | 104% | 84 | 62 |
| SAMPLE 4-13 | ADHESIVE DIFFUSION LAYER 3 | | | 105% | 92 | 62 |

Pp: PIXEL PITCH  P: WIDTH OF LENS
VA h: HORIZONTAL VIEWING ANGLE  VA v: VERTICAL VIEWING ANGLE

FIG. 19

| | FILM/DIFFUSION LAYER KIND | P (μm) | Pp/P (-) | (H/Tt)*(Pp/P) | MOIRE EVALUATION |
|---|---|---|---|---|---|
| SAMPLE 5-1 | DIFFUSER SHEET 1 | 50 | 9.2 | 25.91 | ○ |
| SAMPLE 5-2 | DIFFUSER SHEET 2 | | | 12.85 | ○ |
| SAMPLE 5-3 | DIFFUSER SHEET 3 | | | 12.81 | ○ |
| SAMPLE 5-4 | DIFFUSER SHEET 4 | | | 12.67 | ○ |
| SAMPLE 5-5 | DIFFUSER SHEET 5 | | | 12.32 | ○ |
| SAMPLE 5-6 | DIFFUSER SHEET 6 | | | 11.55 | ○ |
| SAMPLE 5-7 | DIFFUSER SHEET 7 | | | 9.27 | ○ |
| SAMPLE 5-8 | DIFFUSER SHEET 8 | | | 8.49 | ○ |
| SAMPLE 5-9 | DIFFUSER SHEET 9 | | | 6.14 | ○ |
| SAMPLE 5-10 | DIFFUSER SHEET 10 | | | 3.44 | ○ |
| SAMPLE 5-11 | ADHESIVE DIFFUSION LAYER 1 | | | 12.96 | ○ |
| SAMPLE 5-12 | ADHESIVE DIFFUSION LAYER 2 | | | 9.33 | ○ |
| SAMPLE 5-13 | ADHESIVE DIFFUSION LAYER 3 | | | 3.62 | ○ |
| SAMPLE 6-1 | DIFFUSER SHEET 1 | 110 | 4.18 | 11.77 | ○ |
| SAMPLE 6-2 | DIFFUSER SHEET 2 | | | 5.84 | ○ |
| SAMPLE 6-3 | DIFFUSER SHEET 3 | | | 5.82 | ○ |
| SAMPLE 6-4 | DIFFUSER SHEET 4 | | | 5.75 | ○ |
| SAMPLE 6-5 | DIFFUSER SHEET 5 | | | 5.60 | ○ |
| SAMPLE 6-6 | DIFFUSER SHEET 6 | | | 5.25 | ○ |
| SAMPLE 6-7 | DIFFUSER SHEET 7 | | | 4.21 | ○ |
| SAMPLE 6-8 | DIFFUSER SHEET 8 | | | 3.86 | ○ |
| SAMPLE 6-9 | DIFFUSER SHEET 9 | | | 2.79 | ○ |
| SAMPLE 6-10 | DIFFUSER SHEET 10 | | | 1.56 | × |
| SAMPLE 6-11 | ADHESIVE DIFFUSION LAYER 1 | | | 5.89 | ○ |
| SAMPLE 6-12 | ADHESIVE DIFFUSION LAYER 2 | | | 4.24 | ○ |
| SAMPLE 6-13 | ADHESIVE DIFFUSION LAYER 3 | | | 1.64 | ○ |
| SAMPLE 7-1 | DIFFUSER SHEET 1 | 200 | 2.3 | 6.48 | ○ |
| SAMPLE 7-2 | DIFFUSER SHEET 2 | | | 3.21 | ○ |
| SAMPLE 7-3 | DIFFUSER SHEET 3 | | | 3.20 | ○ |
| SAMPLE 7-4 | DIFFUSER SHEET 4 | | | 3.17 | ○ |
| SAMPLE 7-5 | DIFFUSER SHEET 5 | | | 3.08 | ○ |
| SAMPLE 7-6 | DIFFUSER SHEET 6 | | | 2.89 | ○ |
| SAMPLE 7-7 | DIFFUSER SHEET 7 | | | 2.32 | ○ |
| SAMPLE 7-8 | DIFFUSER SHEET 8 | | | 2.12 | ○ |
| SAMPLE 7-9 | DIFFUSER SHEET 9 | | | 1.54 | × |
| SAMPLE 7-10 | DIFFUSER SHEET 10 | | | 0.86 | × |
| SAMPLE 7-11 | ADHESIVE DIFFUSION LAYER 1 | | | 3.24 | ○ |
| SAMPLE 7-12 | ADHESIVE DIFFUSION LAYER 2 | | | 2.33 | ○ |
| SAMPLE 7-13 | ADHESIVE DIFFUSION LAYER 3 | | | 0.90 | × |
| SAMPLE 8-1 | DIFFUSER SHEET 1 | 350 | 1.31 | 3.60 | ○ |
| SAMPLE 8-2 | DIFFUSER SHEET 2 | | | 1.79 | ○ |
| SAMPLE 8-3 | DIFFUSER SHEET 3 | | | 1.78 | ○ |
| SAMPLE 8-4 | DIFFUSER SHEET 4 | | | 1.76 | ○ |
| SAMPLE 8-5 | DIFFUSER SHEET 5 | | | 1.71 | ○ |
| SAMPLE 8-6 | DIFFUSER SHEET 6 | | | 1.61 | ○ |
| SAMPLE 8-7 | DIFFUSER SHEET 7 | | | 1.29 | × |
| SAMPLE 8-8 | DIFFUSER SHEET 8 | | | 1.18 | × |
| SAMPLE 8-9 | DIFFUSER SHEET 9 | | | 0.85 | × |
| SAMPLE 8-10 | DIFFUSER SHEET 10 | | | 0.48 | × |
| SAMPLE 8-11 | ADHESIVE DIFFUSION LAYER 1 | | | 1.80 | ○ |
| SAMPLE 8-12 | ADHESIVE DIFFUSION LAYER 2 | | | 1.30 | × |
| SAMPLE 8-13 | ADHESIVE DIFFUSION LAYER 3 | | | 0.50 | × |

Pp: PIXEL PITCH　　P: WIDTH OF LENS
H: HAZE　　T: TOTAL LIGHT TRANSMISSION AMOUNT

FIG. 20

| | FILM/DIFFUSION LAYER KIND | P (μm) | Pp/P (-) | FRONT LUMINANCE RELATIVE VALUE (%) | VIEWING ANGLE (DEGREE) VA h | VA v |
|---|---|---|---|---|---|---|
| SAMPLE 5-14 | NONE | | | 100% | 95 | 63 |
| SAMPLE 5-1 | DIFFUSER SHEET 1 | | | 47% | 126 | 128 |
| SAMPLE 5-2 | DIFFUSER SHEET 2 | | | 101% | 76 | 67 |
| SAMPLE 5-3 | DIFFUSER SHEET 3 | | | 98% | 75 | 66 |
| SAMPLE 5-4 | DIFFUSER SHEET 4 | | | 99% | 76 | 69 |
| SAMPLE 5-5 | DIFFUSER SHEET 5 | | | 99% | 76 | 65 |
| SAMPLE 5-6 | DIFFUSER SHEET 6 | 50 | 9.2 | 104% | 81 | 69 |
| SAMPLE 5-7 | DIFFUSER SHEET 7 | | | 99% | 86 | 65 |
| SAMPLE 5-8 | DIFFUSER SHEET 8 | | | 99% | 88 | 64 |
| SAMPLE 5-9 | DIFFUSER SHEET 9 | | | 100% | 91 | 64 |
| SAMPLE 5-10 | DIFFUSER SHEET 10 | | | 101% | 93 | 64 |
| SAMPLE 5-11 | ADHESIVE DIFFUSION LAYER 1 | | | 99% | 74 | 63 |
| SAMPLE 5-12 | ADHESIVE DIFFUSION LAYER 2 | | | 99% | 86 | 62 |
| SAMPLE 5-13 | ADHESIVE DIFFUSION LAYER 3 | | | 101% | 92 | 61 |
| SAMPLE 6-14 | NONE | | | 103% | 93 | 62 |
| SAMPLE 6-1 | DIFFUSER SHEET 1 | | | 48% | 126 | 126 |
| SAMPLE 6-2 | DIFFUSER SHEET 2 | | | 103% | 75 | 68 |
| SAMPLE 6-3 | DIFFUSER SHEET 3 | | | 101% | 76 | 67 |
| SAMPLE 6-4 | DIFFUSER SHEET 4 | | | 102% | 74 | 66 |
| SAMPLE 6-5 | DIFFUSER SHEET 5 | | | 102% | 77 | 65 |
| SAMPLE 6-6 | DIFFUSER SHEET 6 | 110 | 4.18 | 106% | 82 | 67 |
| SAMPLE 6-7 | DIFFUSER SHEET 7 | | | 102% | 85 | 63 |
| SAMPLE 6-8 | DIFFUSER SHEET 8 | | | 102% | 86 | 63 |
| SAMPLE 6-9 | DIFFUSER SHEET 9 | | | 102% | 90 | 62 |
| SAMPLE 6-10 | DIFFUSER SHEET 10 | | | 103% | 92 | 62 |
| SAMPLE 6-11 | ADHESIVE DIFFUSION LAYER 1 | | | 102% | 75 | 65 |
| SAMPLE 6-12 | ADHESIVE DIFFUSION LAYER 2 | | | 102% | 85 | 63 |
| SAMPLE 6-13 | ADHESIVE DIFFUSION LAYER 3 | | | 103% | 91 | 60 |
| SAMPLE 7-14 | NONE | | | 104% | 94 | 60 |
| SAMPLE 7-1 | DIFFUSER SHEET 1 | | | 52% | 126 | 127 |
| SAMPLE 7-2 | DIFFUSER SHEET 2 | | | 104% | 75 | 66 |
| SAMPLE 7-3 | DIFFUSER SHEET 3 | | | 102% | 76 | 67 |
| SAMPLE 7-4 | DIFFUSER SHEET 4 | | | 103% | 74 | 67 |
| SAMPLE 7-5 | DIFFUSER SHEET 5 | | | 103% | 78 | 65 |
| SAMPLE 7-6 | DIFFUSER SHEET 6 | 200 | 2.3 | 107% | 82 | 67 |
| SAMPLE 7-7 | DIFFUSER SHEET 7 | | | 102% | 87 | 63 |
| SAMPLE 7-8 | DIFFUSER SHEET 8 | | | 102% | 86 | 63 |
| SAMPLE 7-9 | DIFFUSER SHEET 9 | | | 104% | 91 | 62 |
| SAMPLE 7-10 | DIFFUSER SHEET 10 | | | 105% | 93 | 63 |
| SAMPLE 7-11 | ADHESIVE DIFFUSION LAYER 1 | | | 103% | 75 | 66 |
| SAMPLE 7-12 | ADHESIVE DIFFUSION LAYER 2 | | | 103% | 86 | 62 |
| SAMPLE 7-13 | ADHESIVE DIFFUSION LAYER 3 | | | 104% | 90 | 60 |
| SAMPLE 8-14 | NONE | | | 105% | 96 | 64 |
| SAMPLE 8-1 | DIFFUSER SHEET 1 | | | 53% | 126 | 127 |
| SAMPLE 8-2 | DIFFUSER SHEET 2 | | | 105% | 75 | 65 |
| SAMPLE 8-3 | DIFFUSER SHEET 3 | | | 104% | 76 | 65 |
| SAMPLE 8-4 | DIFFUSER SHEET 4 | | | 104% | 75 | 65 |
| SAMPLE 8-5 | DIFFUSER SHEET 5 | | | 104% | 76 | 64 |
| SAMPLE 8-6 | DIFFUSER SHEET 6 | 350 | 1.31 | 108% | 81 | 66 |
| SAMPLE 8-7 | DIFFUSER SHEET 7 | | | 104% | 86 | 64 |
| SAMPLE 8-8 | DIFFUSER SHEET 8 | | | 103% | 88 | 62 |
| SAMPLE 8-9 | DIFFUSER SHEET 9 | | | 105% | 91 | 62 |
| SAMPLE 8-10 | DIFFUSER SHEET 10 | | | 106% | 93 | 62 |
| SAMPLE 8-11 | ADHESIVE DIFFUSION LAYER 1 | | | 104% | 74 | 64 |
| SAMPLE 8-12 | ADHESIVE DIFFUSION LAYER 2 | | | 104% | 84 | 62 |
| SAMPLE 8-13 | ADHESIVE DIFFUSION LAYER 3 | | | 105% | 92 | 62 |

Pp: PIXEL PITCH  P: WIDTH OF LENS
VA h: HORIZONTAL VIEWING ANGLE  VA v: VERTICAL VIEWING ANGLE

FIG. 21

| | FILM/DIFFUSION LAYER KIND | P (μm) | Pp/P (-) | (H/Tt)*(Pp/P) | MOIRE EVALUATION |
|---|---|---|---|---|---|
| SAMPLE 9-1 | DIFFUSER SHEET 1 | 50 | 10.2 | 28.73 | ○ |
| SAMPLE 9-2 | DIFFUSER SHEET 2 | | | 14.24 | ○ |
| SAMPLE 9-3 | DIFFUSER SHEET 3 | | | 14.20 | ○ |
| SAMPLE 9-4 | DIFFUSER SHEET 4 | | | 14.04 | ○ |
| SAMPLE 9-5 | DIFFUSER SHEET 5 | | | 13.66 | ○ |
| SAMPLE 9-6 | DIFFUSER SHEET 6 | | | 12.81 | ○ |
| SAMPLE 9-7 | DIFFUSER SHEET 7 | | | 10.28 | ○ |
| SAMPLE 9-8 | DIFFUSER SHEET 8 | | | 9.41 | ○ |
| SAMPLE 9-9 | DIFFUSER SHEET 9 | | | 6.81 | ○ |
| SAMPLE 9-10 | DIFFUSER SHEET 10 | | | 3.82 | ○ |
| SAMPLE 9-11 | ADHESIVE DIFFUSION LAYER 1 | | | 14.37 | ○ |
| SAMPLE 9-12 | ADHESIVE DIFFUSION LAYER 2 | | | 10.35 | ○ |
| SAMPLE 9-13 | ADHESIVE DIFFUSION LAYER 3 | | | 4.01 | ○ |
| SAMPLE 10-1 | DIFFUSER SHEET 1 | 110 | 4.64 | 13.04 | ○ |
| SAMPLE 10-2 | DIFFUSER SHEET 2 | | | 6.47 | ○ |
| SAMPLE 10-3 | DIFFUSER SHEET 3 | | | 6.45 | ○ |
| SAMPLE 10-4 | DIFFUSER SHEET 4 | | | 6.37 | ○ |
| SAMPLE 10-5 | DIFFUSER SHEET 5 | | | 6.20 | ○ |
| SAMPLE 10-6 | DIFFUSER SHEET 6 | | | 5.81 | ○ |
| SAMPLE 10-7 | DIFFUSER SHEET 7 | | | 4.67 | ○ |
| SAMPLE 10-8 | DIFFUSER SHEET 8 | | | 4.27 | ○ |
| SAMPLE 10-9 | DIFFUSER SHEET 9 | | | 3.09 | ○ |
| SAMPLE 10-10 | DIFFUSER SHEET 10 | | | 1.73 | ○ |
| SAMPLE 10-11 | ADHESIVE DIFFUSION LAYER 1 | | | 6.52 | ○ |
| SAMPLE 10-12 | ADHESIVE DIFFUSION LAYER 2 | | | 4.70 | ○ |
| SAMPLE 10-13 | ADHESIVE DIFFUSION LAYER 3 | | | 1.82 | ○ |
| SAMPLE 11-1 | DIFFUSER SHEET 1 | 200 | 2.55 | 6.48 | ○ |
| SAMPLE 11-2 | DIFFUSER SHEET 2 | | | 3.21 | ○ |
| SAMPLE 11-3 | DIFFUSER SHEET 3 | | | 3.20 | ○ |
| SAMPLE 11-4 | DIFFUSER SHEET 4 | | | 3.17 | ○ |
| SAMPLE 11-5 | DIFFUSER SHEET 5 | | | 3.08 | ○ |
| SAMPLE 11-6 | DIFFUSER SHEET 6 | | | 2.89 | ○ |
| SAMPLE 11-7 | DIFFUSER SHEET 7 | | | 2.32 | ○ |
| SAMPLE 11-8 | DIFFUSER SHEET 8 | | | 2.12 | ○ |
| SAMPLE 11-9 | DIFFUSER SHEET 9 | | | 1.54 | × |
| SAMPLE 11-10 | DIFFUSER SHEET 10 | | | 0.86 | × |
| SAMPLE 11-11 | ADHESIVE DIFFUSION LAYER 1 | | | 3.24 | ○ |
| SAMPLE 11-12 | ADHESIVE DIFFUSION LAYER 2 | | | 2.33 | ○ |
| SAMPLE 11-13 | ADHESIVE DIFFUSION LAYER 3 | | | 0.90 | × |
| SAMPLE 12-1 | DIFFUSER SHEET 1 | 350 | 1.46 | 4.00 | ○ |
| SAMPLE 12-3 | DIFFUSER SHEET 2 | | | 1.98 | ○ |
| SAMPLE 12-4 | DIFFUSER SHEET 3 | | | 1.98 | ○ |
| SAMPLE 12-5 | DIFFUSER SHEET 4 | | | 1.95 | ○ |
| SAMPLE 12-6 | DIFFUSER SHEET 5 | | | 1.90 | ○ |
| SAMPLE 12-7 | DIFFUSER SHEET 6 | | | 1.78 | ○ |
| SAMPLE 12-8 | DIFFUSER SHEET 7 | | | 1.43 | × |
| SAMPLE 12-9 | DIFFUSER SHEET 8 | | | 1.31 | × |
| SAMPLE 12-10 | DIFFUSER SHEET 9 | | | 0.95 | × |
| SAMPLE 12-11 | DIFFUSER SHEET 10 | | | 0.53 | × |
| SAMPLE 12-12 | ADHESIVE DIFFUSION LAYER 1 | | | 2.00 | ○ |
| SAMPLE 12-13 | ADHESIVE DIFFUSION LAYER 2 | | | 1.44 | × |
| SAMPLE 12-14 | ADHESIVE DIFFUSION LAYER 3 | | | 0.56 | × |

Pp: PIXEL PITCH   P: WIDTH OF LENS
H: HAZE   T: TOTAL LIGHT TRANSMISSION AMOUNT

FIG. 22

| | FILM/DIFFUSION LAYER KIND | P (μm) | Pp/P (-) | FRONT LUMINANCE RELATIVE VALUE (%) | VIEWING ANGLE (DEGREE) VA h | VIEWING ANGLE (DEGREE) VA v |
|---|---|---|---|---|---|---|
| SAMPLE 9-14 | NONE | 50 | 10.2 | 100% | 95 | 63 |
| SAMPLE 9-1 | DIFFUSER SHEET 1 | | | 48% | 126 | 127 |
| SAMPLE 9-2 | DIFFUSER SHEET 2 | | | 102% | 77 | 66 |
| SAMPLE 9-3 | DIFFUSER SHEET 3 | | | 100% | 76 | 65 |
| SAMPLE 9-4 | DIFFUSER SHEET 4 | | | 99% | 75 | 66 |
| SAMPLE 9-5 | DIFFUSER SHEET 5 | | | 100% | 76 | 67 |
| SAMPLE 9-6 | DIFFUSER SHEET 6 | | | 101% | 83 | 64 |
| SAMPLE 9-7 | DIFFUSER SHEET 7 | | | 100% | 89 | 63 |
| SAMPLE 9-8 | DIFFUSER SHEET 8 | | | 99% | 82 | 68 |
| SAMPLE 9-9 | DIFFUSER SHEET 9 | | | 101% | 92 | 64 |
| SAMPLE 9-10 | DIFFUSER SHEET 10 | | | 102% | 95 | 63 |
| SAMPLE 9-11 | ADHESIVE DIFFUSION LAYER 1 | | | 100% | 74 | 63 |
| SAMPLE 9-12 | ADHESIVE DIFFUSION LAYER 2 | | | 101% | 86 | 62 |
| SAMPLE 9-13 | ADHESIVE DIFFUSION LAYER 3 | | | 101% | 92 | 61 |
| SAMPLE 10-14 | NONE | 110 | 4.63 | 103% | 94 | 62 |
| SAMPLE 10-1 | DIFFUSER SHEET 1 | | | 50% | 128 | 127 |
| SAMPLE 10-2 | DIFFUSER SHEET 2 | | | 104% | 77 | 68 |
| SAMPLE 10-3 | DIFFUSER SHEET 3 | | | 102% | 77 | 66 |
| SAMPLE 10-4 | DIFFUSER SHEET 4 | | | 102% | 78 | 67 |
| SAMPLE 10-5 | DIFFUSER SHEET 5 | | | 102% | 76 | 67 |
| SAMPLE 10-6 | DIFFUSER SHEET 6 | | | 103% | 87 | 63 |
| SAMPLE 10-7 | DIFFUSER SHEET 7 | | | 102% | 86 | 66 |
| SAMPLE 10-8 | DIFFUSER SHEET 8 | | | 102% | 83 | 67 |
| SAMPLE 10-9 | DIFFUSER SHEET 9 | | | 102% | 90 | 62 |
| SAMPLE 10-10 | DIFFUSER SHEET 10 | | | 104% | 92 | 63 |
| SAMPLE 10-11 | ADHESIVE DIFFUSION LAYER 1 | | | 102% | 75 | 65 |
| SAMPLE 10-12 | ADHESIVE DIFFUSION LAYER 2 | | | 102% | 85 | 63 |
| SAMPLE 10-13 | ADHESIVE DIFFUSION LAYER 3 | | | 103% | 91 | 60 |
| SAMPLE 11-14 | NONE | 200 | 2.55 | 104% | 94 | 61 |
| SAMPLE 11-1 | DIFFUSER SHEET 1 | | | 52% | 127 | 127 |
| SAMPLE 11-2 | DIFFUSER SHEET 2 | | | 105% | 75 | 67 |
| SAMPLE 11-3 | DIFFUSER SHEET 3 | | | 103% | 77 | 66 |
| SAMPLE 11-4 | DIFFUSER SHEET 4 | | | 104% | 76 | 68 |
| SAMPLE 11-5 | DIFFUSER SHEET 5 | | | 103% | 75 | 68 |
| SAMPLE 11-6 | DIFFUSER SHEET 6 | | | 106% | 86 | 64 |
| SAMPLE 11-7 | DIFFUSER SHEET 7 | | | 103% | 87 | 62 |
| SAMPLE 11-8 | DIFFUSER SHEET 8 | | | 104% | 82 | 68 |
| SAMPLE 11-9 | DIFFUSER SHEET 9 | | | 104% | 92 | 61 |
| SAMPLE 11-10 | DIFFUSER SHEET 10 | | | 105% | 92 | 62 |
| SAMPLE 11-11 | ADHESIVE DIFFUSION LAYER 1 | | | 103% | 75 | 66 |
| SAMPLE 11-12 | ADHESIVE DIFFUSION LAYER 2 | | | 103% | 86 | 62 |
| SAMPLE 11-13 | ADHESIVE DIFFUSION LAYER 3 | | | 104% | 90 | 60 |
| SAMPLE 12-15 | NONE | 350 | 1.46 | 105% | 95 | 63 |
| SAMPLE 12-1 | DIFFUSER SHEET 1 | | | 54% | 127 | 128 |
| SAMPLE 12-3 | DIFFUSER SHEET 2 | | | 105% | 76 | 66 |
| SAMPLE 12-4 | DIFFUSER SHEET 3 | | | 104% | 77 | 63 |
| SAMPLE 12-5 | DIFFUSER SHEET 4 | | | 104% | 75 | 65 |
| SAMPLE 12-6 | DIFFUSER SHEET 5 | | | 104% | 74 | 66 |
| SAMPLE 12-7 | DIFFUSER SHEET 6 | | | 107% | 85 | 63 |
| SAMPLE 12-8 | DIFFUSER SHEET 7 | | | 104% | 88 | 61 |
| SAMPLE 12-9 | DIFFUSER SHEET 8 | | | 106% | 81 | 67 |
| SAMPLE 12-10 | DIFFUSER SHEET 9 | | | 105% | 92 | 63 |
| SAMPLE 12-11 | DIFFUSER SHEET 10 | | | 106% | 93 | 63 |
| SAMPLE 12-12 | ADHESIVE DIFFUSION LAYER 1 | | | 104% | 74 | 64 |
| SAMPLE 12-13 | ADHESIVE DIFFUSION LAYER 2 | | | 104% | 84 | 62 |
| SAMPLE 12-14 | ADHESIVE DIFFUSION LAYER 3 | | | 105% | 92 | 62 |

Pp: PIXEL PITCH  P: WIDTH OF LENS
VA h: HORIZONTAL VIEWING ANGLE  VA v: VERTICAL VIEWING ANGLE

FIG. 23

| | FILM/DIFFUSION LAYER KIND | P (μm) | Pp/P (-) | (H/Tt)*(Pp/P) | MOIRE EVALUATION |
|---|---|---|---|---|---|
| SAMPLE 13-1 | DIFFUSER SHEET 1 | 50 | 6.4 | 18.02 | ○ |
| SAMPLE 13-2 | DIFFUSER SHEET 2 | | | 8.94 | ○ |
| SAMPLE 13-3 | DIFFUSER SHEET 3 | | | 8.91 | ○ |
| SAMPLE 13-4 | DIFFUSER SHEET 4 | | | 8.81 | ○ |
| SAMPLE 13-5 | DIFFUSER SHEET 5 | | | 8.57 | ○ |
| SAMPLE 13-6 | DIFFUSER SHEET 6 | | | 8.04 | ○ |
| SAMPLE 13-7 | DIFFUSER SHEET 7 | | | 6.45 | ○ |
| SAMPLE 13-8 | DIFFUSER SHEET 8 | | | 5.91 | ○ |
| SAMPLE 13-9 | DIFFUSER SHEET 9 | | | 4.27 | ○ |
| SAMPLE 13-10 | DIFFUSER SHEET 10 | | | 2.39 | ○ |
| SAMPLE 13-11 | ADHESIVE DIFFUSION LAYER 1 | | | 9.02 | ○ |
| SAMPLE 13-12 | ADHESIVE DIFFUSION LAYER 2 | | | 6.49 | ○ |
| SAMPLE 13-13 | ADHESIVE DIFFUSION LAYER 3 | | | 2.51 | ○ |
| SAMPLE 13-14 | DIFFUSER SHEET 2 | 32 | 10 | 8.94 | ○ |
| SAMPLE 13-15 | DIFFUSER SHEET 2 | 15 | 21.3 | 8.94 | ○ |
| SAMPLE 14-1 | DIFFUSER SHEET 1 | 110 | 2.91 | 8.20 | ○ |
| SAMPLE 14-2 | DIFFUSER SHEET 2 | | | 4.06 | ○ |
| SAMPLE 14-3 | DIFFUSER SHEET 3 | | | 4.05 | ○ |
| SAMPLE 14-4 | DIFFUSER SHEET 4 | | | 4.01 | ○ |
| SAMPLE 14-5 | DIFFUSER SHEET 5 | | | 3.90 | ○ |
| SAMPLE 14-6 | DIFFUSER SHEET 6 | | | 3.65 | ○ |
| SAMPLE 14-7 | DIFFUSER SHEET 7 | | | 2.93 | ○ |
| SAMPLE 14-8 | DIFFUSER SHEET 8 | | | 2.69 | ○ |
| SAMPLE 14-9 | DIFFUSER SHEET 9 | | | 1.94 | ○ |
| SAMPLE 14-10 | DIFFUSER SHEET 10 | | | 1.09 | × |
| SAMPLE 14-11 | ADHESIVE DIFFUSION LAYER 1 | | | 4.10 | ○ |
| SAMPLE 14-12 | ADHESIVE DIFFUSION LAYER 2 | | | 2.95 | ○ |
| SAMPLE 14-13 | ADHESIVE DIFFUSION LAYER 3 | | | 1.14 | × |
| SAMPLE 15-1 | DIFFUSER SHEET 1 | 200 | 1.6 | 4.53 | ○ |
| SAMPLE 15-2 | DIFFUSER SHEET 2 | | | 2.25 | ○ |
| SAMPLE 15-3 | DIFFUSER SHEET 3 | | | 2.24 | ○ |
| SAMPLE 15-4 | DIFFUSER SHEET 4 | | | 2.22 | ○ |
| SAMPLE 15-5 | DIFFUSER SHEET 5 | | | 2.16 | ○ |
| SAMPLE 15-6 | DIFFUSER SHEET 6 | | | 2.02 | ○ |
| SAMPLE 15-7 | DIFFUSER SHEET 7 | | | 1.62 | ○ |
| SAMPLE 15-8 | DIFFUSER SHEET 8 | | | 1.49 | × |
| SAMPLE 15-9 | DIFFUSER SHEET 9 | | | 1.08 | × |
| SAMPLE 15-10 | DIFFUSER SHEET 10 | | | 0.60 | × |
| SAMPLE 15-11 | ADHESIVE DIFFUSION LAYER 1 | | | 2.27 | ○ |
| SAMPLE 15-12 | ADHESIVE DIFFUSION LAYER 2 | | | 1.63 | ○ |
| SAMPLE 15-13 | ADHESIVE DIFFUSION LAYER 3 | | | 0.63 | × |
| SAMPLE 16-1 | DIFFUSER SHEET 1 | 350 | 0.91 | 2.56 | ○ |
| SAMPLE 16-2 | DIFFUSER SHEET 2 | | | 1.27 | × |
| SAMPLE 16-3 | DIFFUSER SHEET 3 | | | 1.27 | × |
| SAMPLE 16-4 | DIFFUSER SHEET 4 | | | 1.25 | × |
| SAMPLE 16-5 | DIFFUSER SHEET 5 | | | 1.22 | × |
| SAMPLE 16-6 | DIFFUSER SHEET 6 | | | 1.14 | × |
| SAMPLE 16-7 | DIFFUSER SHEET 7 | | | 0.92 | × |
| SAMPLE 16-8 | DIFFUSER SHEET 8 | | | 0.84 | × |
| SAMPLE 16-9 | DIFFUSER SHEET 9 | | | 0.61 | × |
| SAMPLE 16-10 | DIFFUSER SHEET 10 | | | 0.34 | × |
| SAMPLE 16-11 | ADHESIVE DIFFUSION LAYER 1 | | | 1.28 | × |
| SAMPLE 16-12 | ADHESIVE DIFFUSION LAYER 2 | | | 0.92 | × |
| SAMPLE 16-13 | ADHESIVE DIFFUSION LAYER 3 | | | 0.36 | × |

Pp: PIXEL PITCH  P: WIDTH OF LENS
H: HAZE  T: TOTAL LIGHT TRANSMISSION AMOUNT

FIG. 24

| | FILM/DIFFUSION LAYER KIND | P (μm) | Pp/P (-) | FRONT LUMINANCE RELATIVE VALUE (%) | VIEWING ANGLE (DEGREE) VA h | VA v |
|---|---|---|---|---|---|---|
| SAMPLE 13-16 | NONE | | | 94 | 104 | 71 |
| SAMPLE 13-1 | DIFFUSER SHEET 1 | | | 43 | 127 | 128 |
| SAMPLE 13-2 | DIFFUSER SHEET 2 | | | 94 | 85 | 73 |
| SAMPLE 13-3 | DIFFUSER SHEET 3 | | | 95 | 84 | 71 |
| SAMPLE 13-4 | DIFFUSER SHEET 4 | | | 93 | 83 | 71 |
| SAMPLE 13-5 | DIFFUSER SHEET 5 | | | 92 | 86 | 71 |
| SAMPLE 13-6 | DIFFUSER SHEET 6 | 50 | 6.4 | 98 | 87 | 71 |
| SAMPLE 13-7 | DIFFUSER SHEET 7 | | | 94 | 97 | 75 |
| SAMPLE 13-8 | DIFFUSER SHEET 8 | | | 93 | 99 | 72 |
| SAMPLE 13-9 | DIFFUSER SHEET 9 | | | 93 | 103 | 72 |
| SAMPLE 13-10 | DIFFUSER SHEET 10 | | | 95 | 103 | 72 |
| SAMPLE 13-11 | ADHESIVE DIFFUSION LAYER 1 | | | 96 | 74 | 63 |
| SAMPLE 13-12 | ADHESIVE DIFFUSION LAYER 2 | | | 95 | 86 | 62 |
| SAMPLE 13-13 | ADHESIVE DIFFUSION LAYER 3 | | | 94 | 92 | 61 |
| SAMPLE 13-14 | DIFFUSER SHEET 2 | 32 | 10 | 90 | 105 | 72 |
| SAMPLE 13-15 | DIFFUSER SHEET 2 | 15 | 21.3 | 84 | 106 | 74 |
| SAMPLE 14-14 | NONE | | | 97 | 101 | 71 |
| SAMPLE 14-1 | DIFFUSER SHEET 1 | | | 46 | 127 | 128 |
| SAMPLE 14-2 | DIFFUSER SHEET 2 | | | 97 | 84 | 72 |
| SAMPLE 14-3 | DIFFUSER SHEET 3 | | | 97 | 83 | 71 |
| SAMPLE 14-4 | DIFFUSER SHEET 4 | | | 96 | 83 | 73 |
| SAMPLE 14-5 | DIFFUSER SHEET 5 | | | 95 | 85 | 72 |
| SAMPLE 14-6 | DIFFUSER SHEET 6 | 110 | 2.91 | 100 | 86 | 72 |
| SAMPLE 14-7 | DIFFUSER SHEET 7 | | | 96 | 95 | 74 |
| SAMPLE 14-8 | DIFFUSER SHEET 8 | | | 96 | 97 | 72 |
| SAMPLE 14-9 | DIFFUSER SHEET 9 | | | 95 | 101 | 71 |
| SAMPLE 14-10 | DIFFUSER SHEET 10 | | | 97 | 101 | 71 |
| SAMPLE 14-11 | ADHESIVE DIFFUSION LAYER 1 | | | 98 | 75 | 65 |
| SAMPLE 14-12 | ADHESIVE DIFFUSION LAYER 2 | | | 97 | 85 | 63 |
| SAMPLE 14-13 | ADHESIVE DIFFUSION LAYER 3 | | | 96 | 91 | 60 |
| SAMPLE 15-14 | NONE | | | 99 | 98 | 65 |
| SAMPLE 15-1 | DIFFUSER SHEET 1 | | | 48 | 127 | 127 |
| SAMPLE 15-2 | DIFFUSER SHEET 2 | | | 98 | 77 | 67 |
| SAMPLE 15-3 | DIFFUSER SHEET 3 | | | 98 | 78 | 64 |
| SAMPLE 15-4 | DIFFUSER SHEET 4 | | | 98 | 77 | 66 |
| SAMPLE 15-5 | DIFFUSER SHEET 5 | | | 98 | 80 | 65 |
| SAMPLE 15-6 | DIFFUSER SHEET 6 | 200 | 1.6 | 101 | 82 | 68 |
| SAMPLE 15-7 | DIFFUSER SHEET 7 | | | 98 | 88 | 66 |
| SAMPLE 15-8 | DIFFUSER SHEET 8 | | | 98 | 90 | 64 |
| SAMPLE 15-9 | DIFFUSER SHEET 9 | | | 97 | 95 | 65 |
| SAMPLE 15-10 | DIFFUSER SHEET 10 | | | 98 | 95 | 65 |
| SAMPLE 15-11 | ADHESIVE DIFFUSION LAYER 1 | | | 99 | 75 | 66 |
| SAMPLE 15-12 | ADHESIVE DIFFUSION LAYER 2 | | | 98 | 86 | 62 |
| SAMPLE 15-13 | ADHESIVE DIFFUSION LAYER 3 | | | 98 | 90 | 60 |
| SAMPLE 16-14 | NONE | | | 99 | 96 | 63 |
| SAMPLE 16-1 | DIFFUSER SHEET 1 | | | 49 | 127 | 127 |
| SAMPLE 16-2 | DIFFUSER SHEET 2 | | | 99 | 76 | 66 |
| SAMPLE 16-3 | DIFFUSER SHEET 3 | | | 99 | 75 | 64 |
| SAMPLE 16-4 | DIFFUSER SHEET 4 | | | 99 | 75 | 66 |
| SAMPLE 16-5 | DIFFUSER SHEET 5 | | | 99 | 77 | 63 |
| SAMPLE 16-6 | DIFFUSER SHEET 6 | 350 | 0.91 | 103 | 81 | 67 |
| SAMPLE 16-7 | DIFFUSER SHEET 7 | | | 99 | 86 | 64 |
| SAMPLE 16-8 | DIFFUSER SHEET 8 | | | 99 | 88 | 62 |
| SAMPLE 16-9 | DIFFUSER SHEET 9 | | | 98 | 92 | 63 |
| SAMPLE 16-10 | DIFFUSER SHEET 10 | | | 99 | 93 | 63 |
| SAMPLE 16-11 | ADHESIVE DIFFUSION LAYER 1 | | | 99 | 74 | 64 |
| SAMPLE 16-12 | ADHESIVE DIFFUSION LAYER 2 | | | 99 | 84 | 62 |
| SAMPLE 16-13 | ADHESIVE DIFFUSION LAYER 3 | | | 99 | 92 | 62 |

Pp: PIXEL PITCH
P: WIDTH OF LENS
VA h: HORIZONTAL VIEWING ANGLE
VA v: VERTICAL VIEWING ANGLE

FIG. 25

| | FILM/DIFFUSION LAYER KIND | P (μm) | Pp/P (-) | (H/Tt)*(Pp/P) | MOIRE EVALUATION |
|---|---|---|---|---|---|
| SAMPLE 17-1 | DIFFUSER SHEET 1 | 50 | 9.2 | 25.91 | O |
| SAMPLE 17-2 | DIFFUSER SHEET 2 | | | 12.85 | O |
| SAMPLE 17-3 | DIFFUSER SHEET 3 | | | 12.81 | O |
| SAMPLE 17-4 | DIFFUSER SHEET 4 | | | 12.67 | O |
| SAMPLE 17-5 | DIFFUSER SHEET 5 | | | 12.32 | O |
| SAMPLE 17-6 | DIFFUSER SHEET 6 | | | 11.55 | O |
| SAMPLE 17-7 | DIFFUSER SHEET 7 | | | 9.27 | O |
| SAMPLE 17-8 | DIFFUSER SHEET 8 | | | 8.49 | O |
| SAMPLE 17-9 | DIFFUSER SHEET 9 | | | 6.14 | O |
| SAMPLE 17-10 | DIFFUSER SHEET 10 | | | 3.44 | O |
| SAMPLE 17-11 | ADHESIVE DIFFUSION LAYER 1 | | | 12.96 | O |
| SAMPLE 17-12 | ADHESIVE DIFFUSION LAYER 2 | | | 9.33 | O |
| SAMPLE 17-13 | ADHESIVE DIFFUSION LAYER 3 | | | 3.62 | O |
| SAMPLE 18-1 | DIFFUSER SHEET 1 | 110 | 4.18 | 11.77 | O |
| SAMPLE 18-2 | DIFFUSER SHEET 2 | | | 5.84 | O |
| SAMPLE 18-3 | DIFFUSER SHEET 3 | | | 5.82 | O |
| SAMPLE 18-4 | DIFFUSER SHEET 4 | | | 5.75 | O |
| SAMPLE 18-5 | DIFFUSER SHEET 5 | | | 5.60 | O |
| SAMPLE 18-6 | DIFFUSER SHEET 6 | | | 5.25 | O |
| SAMPLE 18-7 | DIFFUSER SHEET 7 | | | 4.21 | O |
| SAMPLE 18-8 | DIFFUSER SHEET 8 | | | 3.86 | O |
| SAMPLE 18-9 | DIFFUSER SHEET 9 | | | 2.79 | O |
| SAMPLE 18-10 | DIFFUSER SHEET 10 | | | 1.56 | X |
| SAMPLE 18-11 | ADHESIVE DIFFUSION LAYER 1 | | | 5.89 | O |
| SAMPLE 18-12 | ADHESIVE DIFFUSION LAYER 2 | | | 4.24 | O |
| SAMPLE 18-13 | ADHESIVE DIFFUSION LAYER 3 | | | 1.64 | O |
| SAMPLE 19-1 | DIFFUSER SHEET 1 | 200 | 2.3 | 6.48 | O |
| SAMPLE 19-2 | DIFFUSER SHEET 2 | | | 3.21 | O |
| SAMPLE 19-3 | DIFFUSER SHEET 3 | | | 3.20 | O |
| SAMPLE 19-4 | DIFFUSER SHEET 4 | | | 3.17 | O |
| SAMPLE 19-5 | DIFFUSER SHEET 5 | | | 3.08 | O |
| SAMPLE 19-6 | DIFFUSER SHEET 6 | | | 2.89 | O |
| SAMPLE 19-7 | DIFFUSER SHEET 7 | | | 2.32 | O |
| SAMPLE 19-8 | DIFFUSER SHEET 8 | | | 2.12 | O |
| SAMPLE 19-9 | DIFFUSER SHEET 9 | | | 1.54 | X |
| SAMPLE 19-10 | DIFFUSER SHEET 10 | | | 0.86 | X |
| SAMPLE 19-11 | ADHESIVE DIFFUSION LAYER 1 | | | 3.24 | O |
| SAMPLE 19-12 | ADHESIVE DIFFUSION LAYER 2 | | | 2.33 | O |
| SAMPLE 19-13 | ADHESIVE DIFFUSION LAYER 3 | | | 0.90 | X |
| SAMPLE 20-1 | DIFFUSER SHEET 1 | 350 | 1.31 | 3.60 | O |
| SAMPLE 20-2 | DIFFUSER SHEET 2 | | | 1.79 | O |
| SAMPLE 20-3 | DIFFUSER SHEET 3 | | | 1.78 | O |
| SAMPLE 20-4 | DIFFUSER SHEET 4 | | | 1.76 | O |
| SAMPLE 20-5 | DIFFUSER SHEET 5 | | | 1.71 | O |
| SAMPLE 20-6 | DIFFUSER SHEET 6 | | | 1.61 | O |
| SAMPLE 20-7 | DIFFUSER SHEET 7 | | | 1.29 | X |
| SAMPLE 20-8 | DIFFUSER SHEET 8 | | | 1.18 | X |
| SAMPLE 20-9 | DIFFUSER SHEET 9 | | | 0.85 | X |
| SAMPLE 20-10 | DIFFUSER SHEET 10 | | | 0.48 | X |
| SAMPLE 20-11 | ADHESIVE DIFFUSION LAYER 1 | | | 1.80 | O |
| SAMPLE 20-12 | ADHESIVE DIFFUSION LAYER 2 | | | 1.30 | X |
| SAMPLE 20-13 | ADHESIVE DIFFUSION LAYER 3 | | | 0.50 | X |

Pp: PIXEL PITCH   P: WIDTH OF LENS
H: HAZE   T: TOTAL LIGHT TRANSMISSION AMOUNT

FIG. 26

| | FILM/DIFFUSION LAYER KIND | P (μm) | Pp/P (-) | FRONT LUMINANCE RELATIVE VALUE (%) | VIEWING ANGLE (DEGREE) VA h | VA v |
|---|---|---|---|---|---|---|
| SAMPLE 17-14 | NONE | 50 | 9.2 | 94% | 103 | 70 |
| SAMPLE 17-1 | DIFFUSER SHEET 1 | | | 44% | 126 | 127 |
| SAMPLE 17-2 | DIFFUSER SHEET 2 | | | 93% | 85 | 72 |
| SAMPLE 17-3 | DIFFUSER SHEET 3 | | | 94% | 82 | 70 |
| SAMPLE 17-4 | DIFFUSER SHEET 4 | | | 94% | 82 | 70 |
| SAMPLE 17-5 | DIFFUSER SHEET 5 | | | 93% | 84 | 70 |
| SAMPLE 17-6 | DIFFUSER SHEET 6 | | | 97% | 86 | 71 |
| SAMPLE 17-7 | DIFFUSER SHEET 7 | | | 95% | 98 | 74 |
| SAMPLE 17-8 | DIFFUSER SHEET 8 | | | 94% | 100 | 71 |
| SAMPLE 17-9 | DIFFUSER SHEET 9 | | | 93% | 102 | 70 |
| SAMPLE 17-10 | DIFFUSER SHEET 10 | | | 94% | 103 | 71 |
| SAMPLE 17-11 | ADHESIVE DIFFUSION LAYER 1 | | | 95% | 74 | 63 |
| SAMPLE 17-12 | ADHESIVE DIFFUSION LAYER 2 | | | 94% | 86 | 62 |
| SAMPLE 17-13 | ADHESIVE DIFFUSION LAYER 3 | | | 95% | 92 | 61 |
| SAMPLE 18-14 | NONE | 110 | 4.18 | 97% | 100 | 70 |
| SAMPLE 18-1 | DIFFUSER SHEET 1 | | | 47% | 126 | 127 |
| SAMPLE 18-2 | DIFFUSER SHEET 2 | | | 97% | 82 | 71 |
| SAMPLE 18-3 | DIFFUSER SHEET 3 | | | 96% | 81 | 70 |
| SAMPLE 18-4 | DIFFUSER SHEET 4 | | | 97% | 81 | 72 |
| SAMPLE 18-5 | DIFFUSER SHEET 5 | | | 95% | 84 | 71 |
| SAMPLE 18-6 | DIFFUSER SHEET 6 | | | 99% | 85 | 71 |
| SAMPLE 18-7 | DIFFUSER SHEET 7 | | | 97% | 94 | 72 |
| SAMPLE 18-8 | DIFFUSER SHEET 8 | | | 96% | 96 | 71 |
| SAMPLE 18-9 | DIFFUSER SHEET 9 | | | 95% | 100 | 70 |
| SAMPLE 18-10 | DIFFUSER SHEET 10 | | | 97% | 100 | 71 |
| SAMPLE 18-11 | ADHESIVE DIFFUSION LAYER 1 | | | 98% | 75 | 65 |
| SAMPLE 18-12 | ADHESIVE DIFFUSION LAYER 2 | | | 97% | 85 | 63 |
| SAMPLE 18-13 | ADHESIVE DIFFUSION LAYER 3 | | | 97% | 91 | 60 |
| SAMPLE 19-14 | NONE | 200 | 2.3 | 99% | 97 | 64 |
| SAMPLE 19-1 | DIFFUSER SHEET 1 | | | 48% | 127 | 126 |
| SAMPLE 19-2 | DIFFUSER SHEET 2 | | | 98% | 76 | 66 |
| SAMPLE 19-3 | DIFFUSER SHEET 3 | | | 98% | 77 | 64 |
| SAMPLE 19-4 | DIFFUSER SHEET 4 | | | 98% | 76 | 65 |
| SAMPLE 19-5 | DIFFUSER SHEET 5 | | | 98% | 79 | 65 |
| SAMPLE 19-6 | DIFFUSER SHEET 6 | | | 100% | 81 | 67 |
| SAMPLE 19-7 | DIFFUSER SHEET 7 | | | 98% | 87 | 65 |
| SAMPLE 19-8 | DIFFUSER SHEET 8 | | | 97% | 88 | 63 |
| SAMPLE 19-9 | DIFFUSER SHEET 9 | | | 96% | 94 | 64 |
| SAMPLE 19-10 | DIFFUSER SHEET 10 | | | 99% | 95 | 64 |
| SAMPLE 19-11 | ADHESIVE DIFFUSION LAYER 1 | | | 98% | 75 | 66 |
| SAMPLE 19-12 | ADHESIVE DIFFUSION LAYER 2 | | | 98% | 86 | 62 |
| SAMPLE 19-13 | ADHESIVE DIFFUSION LAYER 3 | | | 99% | 90 | 60 |
| SAMPLE 20-14 | NONE | 350 | 1.31 | 99% | 95 | 62 |
| SAMPLE 20-1 | DIFFUSER SHEET 1 | | | 49% | 126 | 126 |
| SAMPLE 20-2 | DIFFUSER SHEET 2 | | | 99% | 75 | 65 |
| SAMPLE 20-3 | DIFFUSER SHEET 3 | | | 99% | 74 | 63 |
| SAMPLE 20-4 | DIFFUSER SHEET 4 | | | 99% | 75 | 65 |
| SAMPLE 20-5 | DIFFUSER SHEET 5 | | | 99% | 76 | 64 |
| SAMPLE 20-6 | DIFFUSER SHEET 6 | | | 102% | 80 | 66 |
| SAMPLE 20-7 | DIFFUSER SHEET 7 | | | 99% | 85 | 65 |
| SAMPLE 20-8 | DIFFUSER SHEET 8 | | | 98% | 87 | 61 |
| SAMPLE 20-9 | DIFFUSER SHEET 9 | | | 99% | 90 | 62 |
| SAMPLE 20-10 | DIFFUSER SHEET 10 | | | 99% | 92 | 62 |
| SAMPLE 20-11 | ADHESIVE DIFFUSION LAYER 1 | | | 99% | 74 | 64 |
| SAMPLE 20-12 | ADHESIVE DIFFUSION LAYER 2 | | | 99% | 84 | 62 |
| SAMPLE 20-13 | ADHESIVE DIFFUSION LAYER 3 | | | 99% | 92 | 62 |

Pp: PIXEL PITCH  P: WIDTH OF LENS
VA h: HORIZONTAL VIEWING ANGLE  VA v: VERTICAL VIEWING ANGLE

FIG. 27

| | FILM/DIFFUSION LAYER KIND | P (μm) | Pp/P (-) | (H/Tt)*(Pp/P) | MOIRE EVALUATION |
|---|---|---|---|---|---|
| SAMPLE 21-1 | DIFFUSER SHEET 1 | 50 | 10.2 | 28.73 | ○ |
| SAMPLE 21-2 | DIFFUSER SHEET 2 | | | 14.24 | ○ |
| SAMPLE 21-3 | DIFFUSER SHEET 3 | | | 14.20 | ○ |
| SAMPLE 21-4 | DIFFUSER SHEET 4 | | | 14.04 | ○ |
| SAMPLE 21-5 | DIFFUSER SHEET 5 | | | 13.66 | ○ |
| SAMPLE 21-6 | DIFFUSER SHEET 6 | | | 12.81 | ○ |
| SAMPLE 21-7 | DIFFUSER SHEET 7 | | | 10.28 | ○ |
| SAMPLE 21-8 | DIFFUSER SHEET 8 | | | 9.41 | ○ |
| SAMPLE 21-9 | DIFFUSER SHEET 9 | | | 6.81 | ○ |
| SAMPLE 21-10 | DIFFUSER SHEET 10 | | | 3.82 | ○ |
| SAMPLE 21-11 | ADHESIVE DIFFUSION LAYER 1 | | | 14.37 | ○ |
| SAMPLE 21-12 | ADHESIVE DIFFUSION LAYER 2 | | | 10.35 | ○ |
| SAMPLE 21-13 | ADHESIVE DIFFUSION LAYER 3 | | | 4.01 | ○ |
| SAMPLE 22-1 | DIFFUSER SHEET 1 | 110 | 4.64 | 13.04 | ○ |
| SAMPLE 22-2 | DIFFUSER SHEET 2 | | | 6.47 | ○ |
| SAMPLE 22-3 | DIFFUSER SHEET 3 | | | 6.45 | ○ |
| SAMPLE 22-4 | DIFFUSER SHEET 4 | | | 6.37 | ○ |
| SAMPLE 22-5 | DIFFUSER SHEET 5 | | | 6.20 | ○ |
| SAMPLE 22-6 | DIFFUSER SHEET 6 | | | 5.81 | ○ |
| SAMPLE 22-7 | DIFFUSER SHEET 7 | | | 4.67 | ○ |
| SAMPLE 22-8 | DIFFUSER SHEET 8 | | | 4.27 | ○ |
| SAMPLE 22-9 | DIFFUSER SHEET 9 | | | 3.09 | ○ |
| SAMPLE 22-10 | DIFFUSER SHEET 10 | | | 1.73 | ○ |
| SAMPLE 22-11 | ADHESIVE DIFFUSION LAYER 1 | | | 6.52 | ○ |
| SAMPLE 22-12 | ADHESIVE DIFFUSION LAYER 2 | | | 4.70 | ○ |
| SAMPLE 22-13 | ADHESIVE DIFFUSION LAYER 3 | | | 1.82 | ○ |
| SAMPLE 23-1 | DIFFUSER SHEET 1 | 200 | 2.55 | 6.48 | ○ |
| SAMPLE 23-2 | DIFFUSER SHEET 2 | | | 3.21 | ○ |
| SAMPLE 23-3 | DIFFUSER SHEET 3 | | | 3.20 | ○ |
| SAMPLE 23-4 | DIFFUSER SHEET 4 | | | 3.17 | ○ |
| SAMPLE 23-5 | DIFFUSER SHEET 5 | | | 3.08 | ○ |
| SAMPLE 23-6 | DIFFUSER SHEET 6 | | | 2.89 | ○ |
| SAMPLE 23-7 | DIFFUSER SHEET 7 | | | 2.32 | ○ |
| SAMPLE 23-8 | DIFFUSER SHEET 8 | | | 2.12 | ○ |
| SAMPLE 23-9 | DIFFUSER SHEET 9 | | | 1.54 | × |
| SAMPLE 23-10 | DIFFUSER SHEET 10 | | | 0.86 | × |
| SAMPLE 23-11 | ADHESIVE DIFFUSION LAYER 1 | | | 3.24 | ○ |
| SAMPLE 23-12 | ADHESIVE DIFFUSION LAYER 2 | | | 2.33 | ○ |
| SAMPLE 23-13 | ADHESIVE DIFFUSION LAYER 3 | | | 0.90 | × |
| SAMPLE 24-1 | DIFFUSER SHEET 1 | 350 | 1.46 | 4.00 | ○ |
| SAMPLE 24-2 | DIFFUSER SHEET 2 | | | 1.98 | ○ |
| SAMPLE 24-3 | DIFFUSER SHEET 3 | | | 1.98 | ○ |
| SAMPLE 24-4 | DIFFUSER SHEET 4 | | | 1.95 | ○ |
| SAMPLE 24-5 | DIFFUSER SHEET 5 | | | 1.90 | ○ |
| SAMPLE 24-6 | DIFFUSER SHEET 6 | | | 1.78 | ○ |
| SAMPLE 24-7 | DIFFUSER SHEET 7 | | | 1.43 | × |
| SAMPLE 24-8 | DIFFUSER SHEET 8 | | | 1.31 | × |
| SAMPLE 24-9 | DIFFUSER SHEET 9 | | | 0.95 | × |
| SAMPLE 24-10 | DIFFUSER SHEET 10 | | | 0.53 | × |
| SAMPLE 24-11 | ADHESIVE DIFFUSION LAYER 1 | | | 2.00 | ○ |
| SAMPLE 24-12 | ADHESIVE DIFFUSION LAYER 2 | | | 1.44 | × |
| SAMPLE 24-13 | ADHESIVE DIFFUSION LAYER 3 | | | 0.56 | × |

Pp: PIXEL PITCH　　P: WIDTH OF LENS
H: HAZE　　T: TOTAL LIGHT TRANSMISSION AMOUNT

FIG. 28

| | FILM/DIFFUSION LAYER KIND | P (μm) | Pp/P (-) | FRONT LUMINANCE RELATIVE VALUE (%) | VIEWING ANGLE (DEGREE) VA h | VA v |
|---|---|---|---|---|---|---|
| SAMPLE 21-14 | NONE | 50 | 10.2 | 94% | 102 | 70 |
| SAMPLE 21-1 | DIFFUSER SHEET 1 | | | 45% | 126 | 127 |
| SAMPLE 21-2 | DIFFUSER SHEET 2 | | | 93% | 84 | 71 |
| SAMPLE 21-3 | DIFFUSER SHEET 3 | | | 93% | 83 | 69 |
| SAMPLE 21-4 | DIFFUSER SHEET 4 | | | 94% | 83 | 70 |
| SAMPLE 21-5 | DIFFUSER SHEET 5 | | | 93% | 83 | 69 |
| SAMPLE 21-6 | DIFFUSER SHEET 6 | | | 97% | 85 | 70 |
| SAMPLE 21-7 | DIFFUSER SHEET 7 | | | 93% | 97 | 73 |
| SAMPLE 21-8 | DIFFUSER SHEET 8 | | | 95% | 99 | 71 |
| SAMPLE 21-9 | DIFFUSER SHEET 9 | | | 94% | 101 | 70 |
| SAMPLE 21-10 | DIFFUSER SHEET 10 | | | 93% | 103 | 72 |
| SAMPLE 21-11 | ADHESIVE DIFFUSION LAYER 1 | | | 95% | 74 | 63 |
| SAMPLE 21-12 | ADHESIVE DIFFUSION LAYER 2 | | | 95% | 86 | 62 |
| SAMPLE 21-13 | ADHESIVE DIFFUSION LAYER 3 | | | 93% | 92 | 61 |
| SAMPLE 22-14 | NONE | 110 | 4.63 | 96% | 99 | 69 |
| SAMPLE 22-1 | DIFFUSER SHEET 1 | | | 47% | 125 | 126 |
| SAMPLE 22-2 | DIFFUSER SHEET 2 | | | 96% | 81 | 72 |
| SAMPLE 22-3 | DIFFUSER SHEET 3 | | | 95% | 80 | 69 |
| SAMPLE 22-4 | DIFFUSER SHEET 4 | | | 96% | 80 | 71 |
| SAMPLE 22-5 | DIFFUSER SHEET 5 | | | 95% | 83 | 70 |
| SAMPLE 22-6 | DIFFUSER SHEET 6 | | | 99% | 84 | 70 |
| SAMPLE 22-7 | DIFFUSER SHEET 7 | | | 96% | 93 | 71 |
| SAMPLE 22-8 | DIFFUSER SHEET 8 | | | 97% | 95 | 70 |
| SAMPLE 22-9 | DIFFUSER SHEET 9 | | | 96% | 99 | 69 |
| SAMPLE 22-10 | DIFFUSER SHEET 10 | | | 96% | 99 | 70 |
| SAMPLE 22-11 | ADHESIVE DIFFUSION LAYER 1 | | | 98% | 75 | 65 |
| SAMPLE 22-12 | ADHESIVE DIFFUSION LAYER 2 | | | 97% | 85 | 63 |
| SAMPLE 22-13 | ADHESIVE DIFFUSION LAYER 3 | | | 96% | 91 | 60 |
| SAMPLE 23-14 | NONE | 200 | 2.55 | 98% | 96 | 64 |
| SAMPLE 23-1 | DIFFUSER SHEET 1 | | | 48% | 127 | 125 |
| SAMPLE 23-2 | DIFFUSER SHEET 2 | | | 98% | 75 | 65 |
| SAMPLE 23-3 | DIFFUSER SHEET 3 | | | 97% | 76 | 63 |
| SAMPLE 23-4 | DIFFUSER SHEET 4 | | | 97% | 75 | 64 |
| SAMPLE 23-5 | DIFFUSER SHEET 5 | | | 97% | 78 | 64 |
| SAMPLE 23-6 | DIFFUSER SHEET 6 | | | 100% | 80 | 66 |
| SAMPLE 23-7 | DIFFUSER SHEET 7 | | | 98% | 86 | 64 |
| SAMPLE 23-8 | DIFFUSER SHEET 8 | | | 98% | 87 | 62 |
| SAMPLE 23-9 | DIFFUSER SHEET 9 | | | 97% | 92 | 63 |
| SAMPLE 23-10 | DIFFUSER SHEET 10 | | | 98% | 97 | 63 |
| SAMPLE 7-11 | ADHESIVE DIFFUSION LAYER 1 | | | 99% | 75 | 66 |
| SAMPLE 7-12 | ADHESIVE DIFFUSION LAYER 2 | | | 98% | 86 | 62 |
| SAMPLE 7-13 | ADHESIVE DIFFUSION LAYER 3 | | | 97% | 90 | 60 |
| SAMPLE 24-14 | NONE | 350 | 1.46 | 99% | 94 | 60 |
| SAMPLE 24-1 | DIFFUSER SHEET 1 | | | 49% | 124 | 124 |
| SAMPLE 24-2 | DIFFUSER SHEET 2 | | | 99% | 74 | 63 |
| SAMPLE 24-3 | DIFFUSER SHEET 3 | | | 98% | 72 | 62 |
| SAMPLE 24-4 | DIFFUSER SHEET 4 | | | 99% | 73 | 64 |
| SAMPLE 24-5 | DIFFUSER SHEET 5 | | | 99% | 75 | 63 |
| SAMPLE 24-6 | DIFFUSER SHEET 6 | | | 102% | 79 | 62 |
| SAMPLE 24-7 | DIFFUSER SHEET 7 | | | 99% | 83 | 62 |
| SAMPLE 24-8 | DIFFUSER SHEET 8 | | | 99% | 84 | 60 |
| SAMPLE 24-9 | DIFFUSER SHEET 9 | | | 98% | 88 | 60 |
| SAMPLE 24-10 | DIFFUSER SHEET 10 | | | 99% | 92 | 64 |
| SAMPLE 24-11 | ADHESIVE DIFFUSION LAYER 1 | | | 99% | 74 | 64 |
| SAMPLE 24-12 | ADHESIVE DIFFUSION LAYER 2 | | | 99% | 84 | 62 |
| SAMPLE 24-13 | ADHESIVE DIFFUSION LAYER 3 | | | 98% | 92 | 62 |

Pp: PIXEL PITCH  
P: WIDTH OF LENS  
VA h: HORIZONTAL VIEWING ANGLE  
VA v: VERTICAL VIEWING ANGLE

FIG. 29

| | FILM/DIFFUSION LAYER KIND | P (μm) | Pp/P (-) | (H/Tt) * (Pp/P) | MOIRE EVALUATION |
|---|---|---|---|---|---|
| SAMPLE 25-1 | DIFFUSER SHEET 2 | 50 | 6.4 | 8.94 | ○ |

Pp: PIXEL PITCH    P: WIDTH OF LENS
H: HAZE      T: TOTAL LIGHT TRANSMISSION AMOUNT

FIG. 30

| | FILM/DIFFUSION LAYER KIND | P (μm) | Pp/P (-) | FRONT LUMINANCE RELATIVE VALUE (%) | VIEWING ANGLE (DEGREE) | |
|---|---|---|---|---|---|---|
| | | | | | VA h | VA v |
| SAMPLE 25-1 | DIFFUSER SHEET 2 | 50 | 6.4 | 100% | 95 | 64 |

FIG. 31

| | DIFFUSION FUNCTION LAYER | Pp (μm) | P (μm) | Pp/P (-) | (H/T) (-) | (H/Tt)*(Pp/P) | MOIRE EVALUATION |
|---|---|---|---|---|---|---|---|
| SAMPLE 26-1 | DBEFD | 320 | 50 | 6.40 | 1.74 | 11.14 | ○ |
| SAMPLE 26-2 | DBEFD | 320 | 110 | 2.91 | 1.74 | 5.06 | ○ |
| SAMPLE 26-3 | DBEFD | 320 | 200 | 1.60 | 1.74 | 2.78 | ○ |
| SAMPLE 26-4 | DBEFD | 320 | 350 | 0.91 | 1.74 | 1.59 | × |
| SAMPLE 26-5 | DBEFD | 510 | 50 | 10.20 | 1.74 | 17.75 | ○ |
| SAMPLE 26-6 | DBEFD | 510 | 110 | 4.64 | 1.74 | 8.07 | ○ |
| SAMPLE 26-7 | DBEFD | 510 | 200 | 2.55 | 1.74 | 4.44 | ○ |
| SAMPLE 26-8 | DBEFD | 510 | 350 | 1.46 | 1.74 | 2.54 | ○ |
| SAMPLE 26-9 | DBEFD | 460 | 50 | 9.20 | 1.74 | 16.01 | ○ |
| SAMPLE 26-10 | DBEFD | 460 | 110 | 4.18 | 1.74 | 7.28 | ○ |
| SAMPLE 26-11 | DBEFD | 460 | 200 | 2.30 | 1.74 | 4.00 | ○ |
| SAMPLE 26-12 | DBEFD | 460 | 350 | 1.31 | 1.74 | 2.29 | ○ |
| SAMPLE 26-13 | DBEFD | 320 | 50 | 6.40 | 1.74 | 11.14 | ○ |
| SAMPLE 26-14 | DBEFD | 320 | 110 | 2.91 | 1.74 | 5.06 | ○ |
| SAMPLE 26-15 | DBEFD | 320 | 200 | 1.60 | 1.74 | 2.78 | ○ |
| SAMPLE 26-16 | DBEFD | 320 | 350 | 0.91 | 1.74 | 1.59 | × |
| SAMPLE 26-17 | DBEFD | 510 | 50 | 10.20 | 1.74 | 17.75 | ○ |
| SAMPLE 26-18 | DBEFD | 510 | 110 | 4.64 | 1.74 | 8.07 | ○ |
| SAMPLE 26-19 | DBEFD | 510 | 200 | 2.55 | 1.74 | 4.44 | ○ |
| SAMPLE 26-20 | DBEFD | 510 | 350 | 1.46 | 1.74 | 2.54 | ○ |
| SAMPLE 26-21 | DBEFD | 460 | 50 | 9.20 | 1.74 | 16.01 | ○ |
| SAMPLE 26-22 | DBEFD | 460 | 110 | 4.18 | 1.74 | 7.28 | ○ |
| SAMPLE 26-23 | DBEFD | 460 | 200 | 2.30 | 1.74 | 4.00 | ○ |
| SAMPLE 26-24 | DBEFD | 460 | 350 | 1.46 | 1.74 | 2.54 | ○ |

Pp: PIXEL PITCH  P: WIDTH OF LENS
H: HAZE  T: TOTAL LIGHT TRANSMISSION AMOUNT

FIG. 32

| | FILM/DIFFUSION LAYER KIND | Pp (μm) | P (μm) | Pp/P (-) | (H/T) (-) | FRONT LUMINANCE RELATIVE VALUE (%) | VIEWING ANGLE (DEGREE) VAh | VIEWING ANGLE (DEGREE) VAv |
|---|---|---|---|---|---|---|---|---|
| SAMPLE 26-1 | DBEFD | 320 | 50 | 6.40 | 1.74 | 137% | 96 | 69 |
| SAMPLE 26-2 | DBEFD | 320 | 110 | 2.91 | 1.74 | 141% | 96 | 66 |
| SAMPLE 26-3 | DBEFD | 320 | 200 | 1.60 | 1.74 | 143% | 96 | 66 |
| SAMPLE 26-4 | DBEFD | 320 | 350 | 0.91 | 1.74 | 145% | 95 | 67 |
| SAMPLE 26-5 | DBEFD | 510 | 50 | 10.20 | 1.74 | 139% | 95 | 69 |
| SAMPLE 26-6 | DBEFD | 510 | 110 | 4.64 | 1.74 | 142% | 95 | 65 |
| SAMPLE 26-7 | DBEFD | 510 | 200 | 2.55 | 1.74 | 143% | 96 | 65 |
| SAMPLE 26-8 | DBEFD | 510 | 350 | 1.46 | 1.74 | 145% | 96 | 65 |
| SAMPLE 26-9 | DBEFD | 460 | 50 | 9.20 | 1.74 | 140% | 95 | 67 |
| SAMPLE 26-10 | DBEFD | 460 | 110 | 4.18 | 1.74 | 142% | 95 | 67 |
| SAMPLE 26-11 | DBEFD | 460 | 200 | 2.30 | 1.74 | 144% | 95 | 66 |
| SAMPLE 26-12 | DBEFD | 460 | 350 | 1.31 | 1.74 | 145% | 95 | 67 |
| SAMPLE 26-13 | DBEFD | 320 | 50 | 6.40 | 1.74 | 129% | 106 | 76 |
| SAMPLE 26-14 | DBEFD | 320 | 110 | 2.91 | 1.74 | 132% | 104 | 79 |
| SAMPLE 26-15 | DBEFD | 320 | 200 | 1.60 | 1.74 | 136% | 100 | 68 |
| SAMPLE 26-16 | DBEFD | 320 | 350 | 0.91 | 1.74 | 138% | 98 | 67 |
| SAMPLE 26-17 | DBEFD | 510 | 50 | 10.20 | 1.74 | 130% | 105 | 75 |
| SAMPLE 26-18 | DBEFD | 510 | 110 | 4.64 | 1.74 | 133% | 103 | 78 |
| SAMPLE 26-19 | DBEFD | 510 | 200 | 2.55 | 1.74 | 136% | 100 | 67 |
| SAMPLE 26-20 | DBEFD | 510 | 350 | 1.46 | 1.74 | 137% | 97 | 66 |
| SAMPLE 26-21 | DBEFD | 460 | 50 | 9.20 | 1.74 | 130% | 104 | 74 |
| SAMPLE 26-22 | DBEFD | 460 | 110 | 4.18 | 1.74 | 132% | 102 | 77 |
| SAMPLE 26-23 | DBEFD | 460 | 200 | 2.30 | 1.74 | 134% | 100 | 66 |
| SAMPLE 26-24 | DBEFD | 460 | 350 | 1.46 | 1.74 | 136% | 96 | 65 |

LIQUID CRYSTAL DISPLAY, OPTICAL SHEET MANUFACTURING METHOD, AND OPTICAL SHEET

CROSS REFERENCE TO RELATED APPLICATION

The present application claims priority to Japanese Patent Application Nos. 2005-159691 filed in the Japanese Patent Office on Jan. 31, 2005, and 2006-102260 the entire contents of which are being incorporated herein by reference.

BACKGROUND

The present application relates to a liquid crystal display, an optical sheet manufacturing method, and an optical sheet which make it possible to achieve an improvement in luminance and prevent the occurrence of moiré.

A liquid crystal display (LCD) realizes lower power consumption and reduced thickness in comparison to a cathode ray tube (CRT). At present, liquid crystal displays of various sizes are used for a wide variety of applications ranging from small-sized equipment such as a portable telephone and a digital camera, to a large-sized liquid-crystal television.

Liquid crystal displays are divided into a transmission type and a reflection type. A transmission type liquid crystal display, in particular, includes a liquid crystal display panel having a liquid crystal layer sandwiched by a pair of transparent substrates, and a backlight unit as an illumination light source. Backlight units include, in addition to a direct type one in which the light source is arranged directly below the liquid crystal display panel, an edge light type one using a light guide plate.

Generally, an optical sheet or film (hereinafter, generically referred to as "sheet" unless otherwise specified) having a light-condensing property, such as a prism sheet or lens sheet for orienting the outgoing direction of light from a light source to the front direction, is used for the backlight unit for a liquid crystal display. For example, a prism sheet has a large number of prisms having a triangular cross section arranged on the light-emergent side surface, and causes light incident on the prism sheet to be refracted by and transmitted through the slopes of the prisms, thereby condensing the light into the front direction.

Meanwhile, light-dark fringes (moiré) occur due to the interference of light between the prism arrangement pitch of the prism sheet and the pixel arrangement pitch of the liquid crystal display panel. It is known that narrowing the prism arrangement pitch (to 100 μm or less, for example) proves effective in preventing the occurrence of such moiré.

Further, the occurrence of moiré due to the interference of light between the prism arrangement pitch and the pixel pitch can be prevented by arranging a diffuser sheet between the prism sheet and the liquid crystal display panel (Japanese Unexamined Patent Application Publication No. 6-102506).

However, the method of simply narrowing the prism arrangement pitch leads to a significant decrease in front luminance, resulting in a deterioration of image quality.

Further, with the method of arranging a diffuser sheet between the prism sheet and the liquid crystal display panel, depending on the characteristics of the diffusion film, there may be cases where the light beams condensed by the prisms cannot be effectively utilized, making it impossible to attain an intended luminance improving effect.

SUMMARY

A liquid crystal display, an optical sheet manufacturing method, and an optical sheet are provided, which make it possible to prevent the occurrence of moiré while suppressing a decrease in front luminance.

According to an embodiment, a liquid crystal display in which a decrease in front luminance is suppressed and which is free from moiré is constructed by determining the upper limit of the pitch (P) of irregularities of an optical sheet on the basis of the pixel pitch (Pp) of a liquid crystal display panel, and the haze value (H) and total light transmittance (Tt) of a diffuser sheet arranged on the light-emergent side of the optical sheet.

The diffuser sheet is arranged on the light-emergent side of the optical sheet. The haze value H and total light transmittance Tt of the diffuser sheet are characteristics each having a value unique to each individual diffuser sheet, and are determined in accordance with the construction, kind, specifications, or the like of the diffuser sheet used. The haze value H indicates the degree of diffusion; the larger the value of H, the greater the light diffusion effect, and hence the greater the degree to which the periodicity of the distribution of light emerging from the condenser sheet 14 is mitigated. Tt represents the total transmittance of the light transmitting through the diffuser sheet. A larger value of Tt indicates a greater contribution to the luminance improvement. Moiré occurs due to the interference of light resulting from the periodicity of the structure of the irregularities of the optical sheet and of the pixel pitch of the liquid crystal display panel. Therefore, by optimizing the characteristics of the diffuser sheet such as the haze value and the total light transmittance, it is possible to achieve both the prevention of moiré due to lessening of the periodicity, and suppression of a decrease in front luminance. As will be described later, the present inventors have directed attention to the value of $(H/Tt)\cdot(Pp/P)$, and found that the occurrence of moiré can be prevented and a decrease in front luminance can be suppressed when this value is equal to a predetermined value or more, thereby completing the present application.

That is, a liquid crystal display according to an embodiment relates to a liquid crystal display including: a liquid crystal display panel; a light source arranged on a back surface side of the liquid crystal display panel; an optical sheet with a light-condensing property arranged between the liquid crystal display panel and the light source, the optical sheet having a number of irregularities arranged continuously on a principal surface of the optical sheet; and a diffuser sheet arranged between the liquid crystal display panel and the optical sheet, wherein when an arrangement pitch of the irregularities of the optical sheet is P [μm], a haze value of the diffuser sheet is H [%], a total light transmittance of the diffuser sheet is Tt [%], and a pixel pitch of the liquid crystal display panel is Pp [μm], the following relationship is satisfied:

$$(H/Tt)\cdot(Pp/P) \geq 1.6.$$

Further, an optical sheet manufacturing method according to an embodiment relates to an optical sheet manufacturing method for manufacturing an optical sheet with a light-condensing property used in combination with a liquid crystal display panel and a diffuser sheet, the optical sheet having a number of irregularities arranged continuously on a principal surface of the optical sheet, including determining an upper limit of an arrangement pitch (P) of the irregularities on the basis of the following expression, where an arrangement pitch of the irregularities of the optical sheet is P [μm], a haze value of the diffuser sheet is H [%], a total light transmittance of the diffuser sheet is Tt [%], and a pixel pitch of the liquid crystal display panel is Pp [μm]:

$$P \leq (H \cdot Pp)/(1.6Tt).$$

Further, an optical sheet according to an embodiment relates to an optical sheet with a light-condensing property used in combination with a liquid crystal display panel and a diffuser sheet, including a number of irregularities arranged continuously on a principal surface of the optical sheet, wherein when an arrangement pitch of the irregularities of the optical sheet is P [μm], a haze value of the diffuser sheet is H [%], a total light transmittance of the diffuser sheet is Tt [%], and a pixel pitch of the liquid crystal display panel is Pp [μm], the following relationship is satisfied:

$$P \leq (H \cdot Pp)/(1.6Tt).$$

If $P>(H \cdot Pp)/(1.6Tt)$, moiré becomes liable to occur, causing a deterioration of image quality. Although also depending on the size of the pixel pitch or the haze value or total light transmittance of the diffuser sheet, the size of the arrangement pitch P is preferably set to 110 μm or more in order to achieve an improvement in luminance.

The shape of the irregularities of the optical sheet is not particularly limited. Preferably, the irregularities are formed as prism members of a triangular cross-sectional shape, hyperbolic cylindrical lens members, or aspheric cylindrical lens members. When the irregularities are formed as prism members, the front luminance can be enhanced, and when the irregularities are formed as cylindrical lens members, an improvement in viewing angle can be achieved.

As described in the foregoing, according to an embodiment, it is possible to prevent the occurrence of moiré while suppressing a decrease in front luminance.

Additional features and advantages of the present application are described in, and will be apparent from, the following Detailed Description and the figures.

BRIEF DESCRIPTION OF THE FIGURES

FIG. 2 is a schematic perspective view of a condenser sheet as an optical sheet according to an embodiment, in which part A shows a prism sheet, and part B shows a cylindrical lens sheet.

FIG. 9 is a view showing another modification of the construction of the condenser sheet shown in FIG. 8.

FIG. 11 is a view illustrating a modification of the construction of the condenser sheet shown in FIGS. 8 to 10.

FIG. 13 is a diagram showing the results of an experiment examining, with respect to various samples having projections provided on the back surface side of the condenser sheet, the relationship between how the projections are formed and the front luminance.

FIG. 15 is a diagram showing the backward scattering characteristics of various diffuser sheets used in an Example according to an embodiment.

FIG. 16 is a diagram showing the forward scattering characteristics of various diffuser sheets used in an Example according to an embodiment.

FIG. 17 is a diagram showing the evaluation results on moiré when liquid crystal displays were constructed through the combination of various diffuser sheets, a prism sheet, and a liquid crystal display panel with a pixel pitch of 320 μm, according to an Example according to an embodiment.

FIG. 18 is a diagram showing the front luminance and viewing angle characteristics of the various samples shown in FIG. 17, according to an Example according to an embodiment.

FIG. 19 is a diagram showing the evaluation results on moiré when liquid crystal displays were constructed through the combination of various diffuser sheets, a prism sheet, and a liquid crystal display panel with a pixel pitch of 460 μm, according to an Example according to an embodiment.

FIG. 20 is a diagram showing the front luminance and viewing angle characteristics of the various samples shown in FIG. 19, according to an Example according to an embodiment.

FIG. 21 is a diagram showing the evaluation results on moiré when liquid crystal displays were constructed through the combination of various diffuser sheets, a prism sheet, and a liquid crystal display panel with a pixel pitch of 510 μm, according to an Example according to an embodiment.

FIG. 22 is a diagram showing the front luminance and viewing angle characteristics of the various samples shown in FIG. 21, according to an Example according to an embodiment.

FIG. 23 is a diagram showing the evaluation results on moiré when liquid crystal displays were constructed through the combination of various diffuser sheets, a hyperbolic cylindrical lens sheet, and a liquid crystal display panel with a pixel pitch of 320 μm, according to an Example according to an embodiment.

FIG. 24 is a diagram showing the front luminance and viewing angle characteristics of the various samples shown in FIG. 23, according to an Example according to an embodiment.

FIG. 25 is a diagram showing the evaluation results on moiré when liquid crystal displays were constructed through the combination of various diffuser sheets, a hyperbolic cylindrical lens sheet, and a liquid crystal display panel with a pixel pitch of 460 μm, according to an Example according to an embodiment.

FIG. 26 is a diagram showing the front luminance and viewing angle characteristics of the various samples shown in FIG. 25, according to an Example according to an embodiment.

FIG. 27 is a diagram showing the evaluation results on moiré when liquid crystal displays were constructed through the combination of various diffuser sheets, a hyperbolic cylindrical lens sheet, and a liquid crystal display panel with a pixel pitch of 510 μm, according to an Example according to an embodiment.

FIG. 28 is a diagram showing the front luminance and viewing angle characteristics of the various samples shown in FIG. 27, according to an Example according to an embodiment.

FIG. 29 is a diagram showing the evaluation results on moiré in the case where the pixel pitch is 320 μm when the prism sheet "BEFIII" manufactured by 3M was used as the condenser sheet.

FIG. 30 is a diagram showing the front luminance and viewing angle characteristics in the case where the pixel pitch is 320 μm when the prism sheet "BEFIII" manufactured by 3M was used as the condenser sheet.

FIG. 31 is a diagram showing the evaluation results on moiré in the case where the reflection type polarization separating element with diffusion function, "DBEFD", manufactured by 3M was used as the diffuser sheet.

FIG. 32 is a diagram showing the front luminance and viewing angle characteristics in the case where the reflection type polarization separating element with diffusion function, "DBEFD", manufactured by 3M was used as the diffuser sheet.

DETAILED DESCRIPTION

Figure 1:
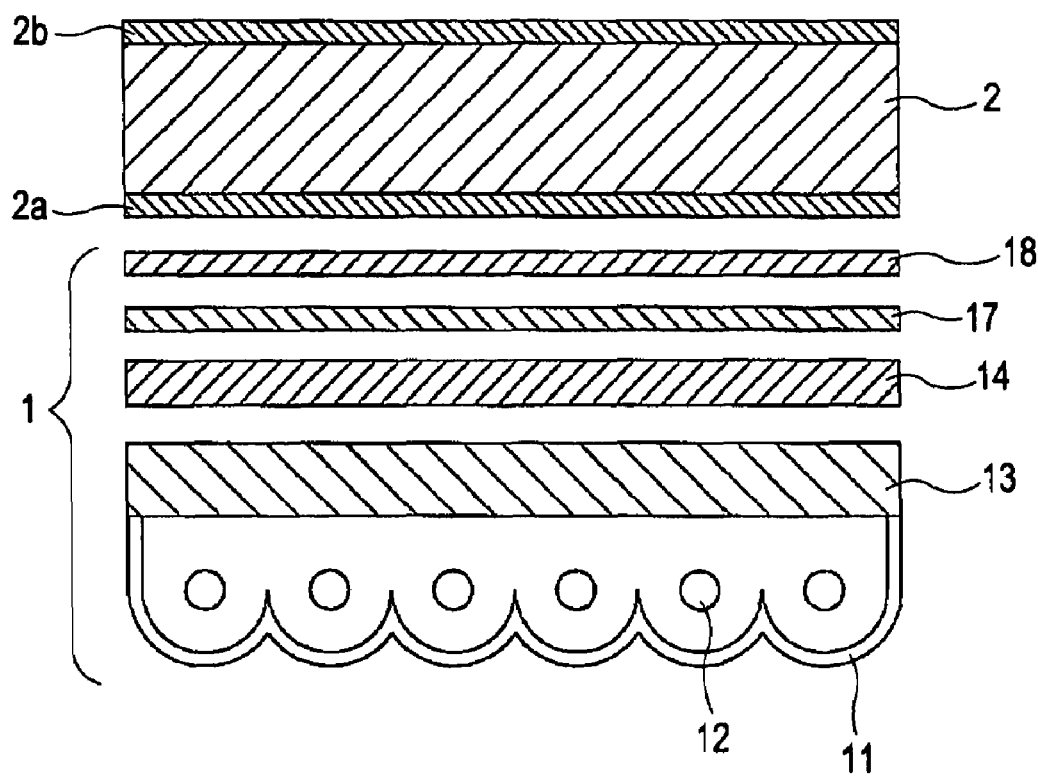
FIG. 1 is a schematic diagram of a liquid crystal display according to an embodiment.

An embodiment will now be described with reference to the drawings. FIG. 1 is a sectional view schematically showing an example of the construction of a liquid crystal display 10 according to an embodiment of the present application. First, the construction of the liquid crystal display 10 will be schematically described.

As shown in FIG. 1, the liquid crystal display 10 includes a backlight unit 1 and a liquid crystal display panel 2. While the description is directed to a case where the backlight unit 1 is of a direct type in this example, the backlight unit 1 may be constructed as an edge-light type one.

As shown in FIG. 1, the backlight unit 1 serves to supply light to the liquid crystal display panel 2, and is arranged directly below the back surface of the liquid crystal display panel 2. The liquid crystal display panel 2 temporally and spatially modulates the light supplied from the backlight unit 1 to display information. Polarizing plates 2a, 2b are provided on both surfaces of the liquid crystal display panel 2. Of the incident light beams, each of the polarizing plate 2a and polarizing plate 2b transmits only one of orthogonal polarized light components, and blocks the other by absorption. The polarizing plate 2a and the polarizing plate 2b are provided in such a manner that, for example, their transmission axes are orthogonal to each other.

The liquid crystal display panel 2 has a plurality of pixels arranged at a predetermined pitch in the horizontal and vertical directions of the panel. By controlling the transmittance of light radiated from the backlight unit 1, a predetermined image is displayed on the front side of the panel. While the display image is formed as a color image, the display image is not limited to this, of course.

As shown in FIG. 1, the backlight unit 1 includes, for example, a reflector plate 11, a light source 12, a diffuser plate 13, a condenser sheet 14, a diffuser sheet 17, and a reflection-type polarizer 18. It should be noted that the diffuser plate 13 and the reflection-type polarizer 18 may not be arranged as required.

The light source 12 serves to supply light to the liquid crystal display panel 2. In the illustrated example, a plurality of light sources are arranged, and each light source is formed by, for example, a fluorescent lamp (FL), an electroluminescent (EL) element, a light-emitting diode (LED), or the like.

The reflector plate 11 is provided so as to cover the light source 12 from below and the sides. The reflector plate 11 reflects light emitted downward or laterally from the light source 12, thereby directing the light toward the liquid crystal display panel 2.

The diffuser plate 13 is provided above the light source 12, and serves to diffuse light emerging from the light source 12 and light reflected by the reflector plate 11 to achieve a uniform luminance. The diffuser plate 13 used in this example is, for example, a relatively thick one with light-diffusible fine particles dispersed in a translucent material.

The condenser sheet 14 corresponds to an optical sheet according to an embodiment. The condenser sheet 14 is arranged above the diffuser plate 13 to thereby enhance the directivity or the like of radiation light. The detailed construction of the condenser sheet 14 will be described later.

The diffuser sheet 17 is provided above the condenser sheet 14, and causes the light whose directivity has been enhanced by the condenser light 14 to emerge in a diffused form within a fixed angular range. As the diffuser sheet 17 in this example, there is used one including a diffusing surface of an irregularity structure or the like having light diffusibility, provided on the light-emergent surface side of a translucent sheet base.

The reflection-type polarizer 18 is provided above the diffuser seat 17. Of the light beams diffused by the diffuser sheet 17, the reflection-type polarizer 18 transmits only one of orthogonal polarized light components and reflects the other. The oscillating direction of the polarized light component transmitted through the reflection-type polarizer 18 is set to be parallel to the transmission axis of the polarizing plate 2a arranged on the light-incident surface side of the liquid crystal display panel 2.

Next, the detailed construction of the condenser sheet (optical sheet) 14 according to an embodiment will be described.

Part A and part B of FIG. 2 are each a perspective view schematically showing an example of the configuration of the condenser sheet 14 according to an embodiment of an embodiment. The condenser sheet 14 has a substantially rectangular sheet-like configuration, and is formed by a prism sheet or a lens sheet having a large number of irregularities with a light condensing function arranged continuously in one direction (X direction in the drawing) on a principal surface on one side of the condenser sheet 14. In this specification, the term "sheet" includes not only a film but also various kinds of thin-sheet material having flexibility or some degree of hardness or rigidity.

The condenser sheet 14 shown in part A of FIG. 2 is a prism sheet having, as the above-mentioned irregularities, a large number of prism members 14P with a triangular cross-section arranged on the light-emergent surface side thereof. Further, the condenser sheet 14 shown in part B of FIG. 2 is a prism sheet having, as the above-mentioned irregularities, a large number of cylindrical lens members 14L with a hyperbolic surface, a parabolic surface, or a high-order aspheric surface arranged on the light-emergent surface side thereof.

While the cross-sectional shape of each prism member 14P is an isosceles triangle with an apex angle of 90 degrees in this example, the apex angle is not limited to 90 degrees. Further, while no particular limitations are placed on the prism height, pitch, and the like, an upper limit is set for the prism arrangement pitch as will be described later.

On the other hand, in the cylindrical lens member 14L, when the Z axis is taken in the direction parallel to the normal direction of the condenser sheet 14, the X axis is taken in the row direction of the cylindrical lens member 14L, and the Y axis is taken in the direction of the generator of the cylindrical lens member 14L, a finite focal length exists on the emerging side of radiation light so that Expression (1) below is satisfied, and the cylindrical lens member 14L has a cross section in the shape of a laterally symmetrical hyperbolic or parabolic surface.

$$Z=X2/(R+\sqrt{(R2-(1+K)X2)}) \quad (1)$$

where R represents the radius of curvature [μm] at the top apex, and K represents a conic constant.

It should be noted that in this specification, $\sqrt{\phantom{x}}$ means the square root of the value obtained by the mathematical expression that follows.

Alternatively, the cylindrical lens member 14L has a finite focal length that is present on the emerging side of radiation light so that Expression (2) below is satisfied, and has a cross section in the shape of a laterally symmetrical aspheric surface.

$$Z=X2/(R+\sqrt{(R2-(1+K)X2)})+AX2+BX2+CX2+\ldots \quad (2)$$

where R represents the radius of curvature [μm] at the top apex, K represents a conic constant, and A, B, C . . . each represent an aspheric coefficient.

Figure 3:
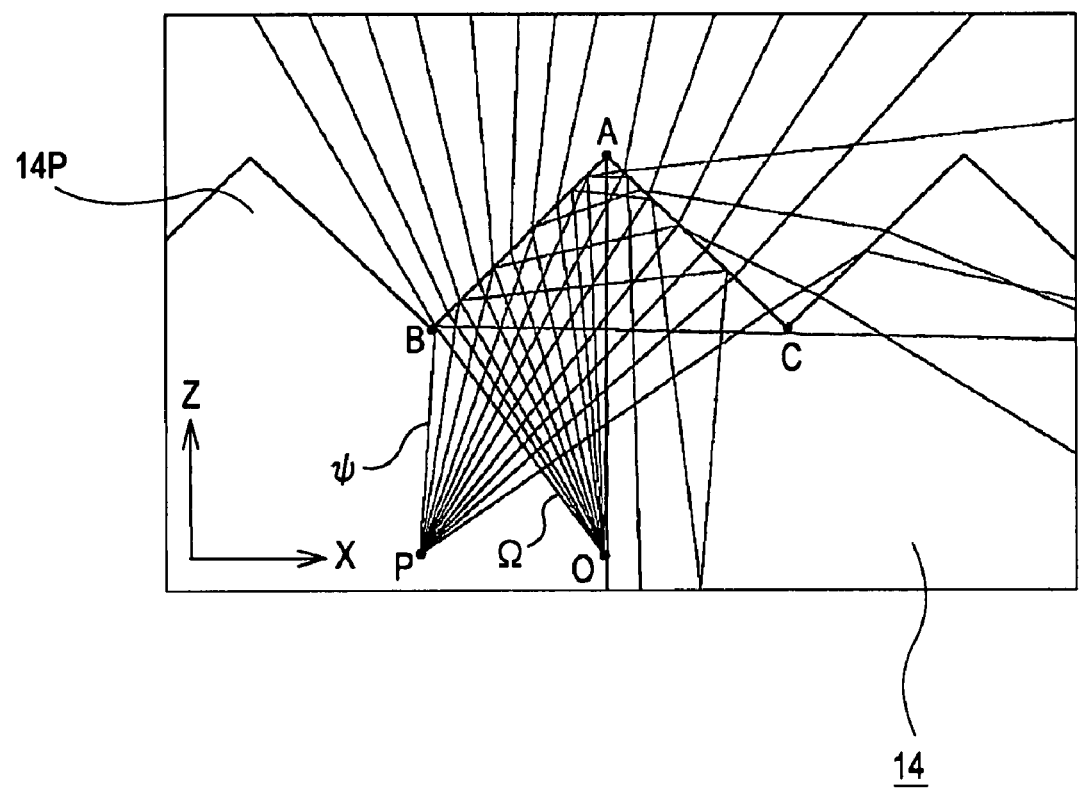
FIG. 3 is a diagram illustrating the trajectory of incident light when a prism sheet is used as a condenser sheet.

FIG. 3 is an enlarged sectional view taken along the X and Y axes of the condenser sheet (prism sheet) 14 having the prism members 14P shown in FIG. 2A. In FIG. 3, the point A indicates the apex of the prism, and the points B and C each indicate a point of junction with an adjacent prism. Further, the point O indicates a virtual light source point located directly below the apex A, and the point P indicates a virtual light source point located directly below the junction B. Further, FIG. 3 shows the trajectory of a light flux Ω incident on the surface AB from the virtual light source point O, and the trajectory of a light flux φ incident on the surfaces AB and AC from the virtual light source point P. The trajectories of these light beams Ω and φ are obtained by simulation.

In the condenser sheet 14 shown in FIG. 13, the transmission paths of incident light beams differ depending on their incident angles. The light flux Ω becomes a first-order transmitted light component that is refracted by and transmitted through the prism slope (AB surface), and is effectively used for achieving enhanced front luminance. The light beam φ can be divided into a return light component that is reflected by one prism slope (AB surface) before being reflected by the other prism surface (AC surface) again to be returned to the incident side, and a second-order transmitted light component transmitted through the prism surface (AC surface) and emitted to the prism front surface. The return light component is a light flux component that enters the diffuser plate 13, which is regarded as a light-emitting surface (surface light source), to be diffused and reflected by the diffuser plate 13, thus effectively contributing to increasing the luminance of the light-emitting surface. In contrast, the second-order transmitted light component is a light flux component that emerges on the wide angle side outside of the effective viewing angle of the liquid crystal display panel 2 and hence does not contribute to the improvement of luminance.

As described above, in the condenser sheet (prism sheet) 14 shown in FIG. 3, incident light is condensed into the front direction as it is refracted and transmitted, so the directional characteristics are improved so as to increase the front luminance. Further, reflected light is diffused and scattered by the diffuser plate 13 regarded as a light-emitting surface (surface light source), and as a result of the increased luminance of the light-emitting surface, the front luminance increases.

Figure 4:
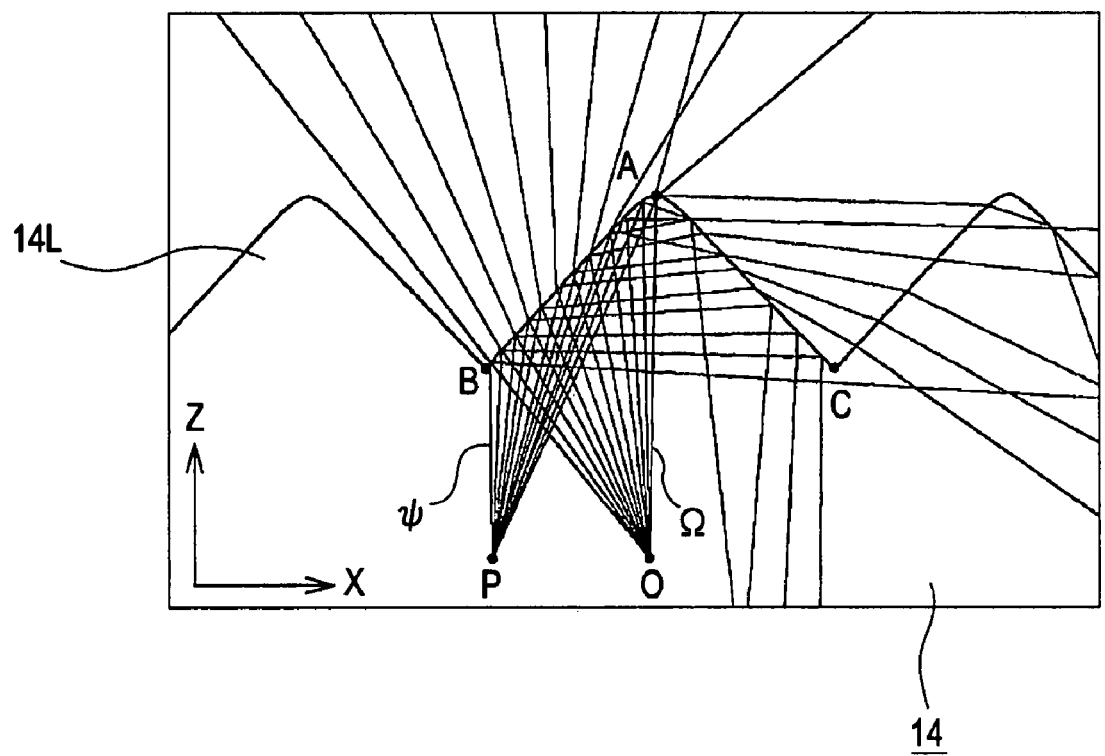
FIG. 4 is a diagram illustrating the trajectory of incident light when a hyperbolic cylindrical lens sheet is used as a condenser sheet.

On the other hand, FIG. 4 is an enlarged sectional view taken along the X and Z axes of the condenser sheet (lens sheet) 14 having the cylindrical lens members 14L shown in FIG. 2B. The cylindrical lens member 14L shown in FIG. 4 has a hyperbolic shape represented by the following expression obtained by substituting R=1 [μm], K=−2 into Expression (1) mentioned above:

$$Z=X2/(1+\sqrt{(R2-(1+X2))})$$

As shown in FIG. 4, the light flux Ω is refracted and transmitted toward the front of the condenser sheet 14. Most of the light flux φ undergoes total reflection, and is refracted or totally reflected by the surface between A and C to become a return light component. Further, the refracted light at the surface near the apex undergoes a change in the normal direction so that the light distribution is diffused, thereby mitigating the generation of a second-order transmitted light component.

Figure 5:
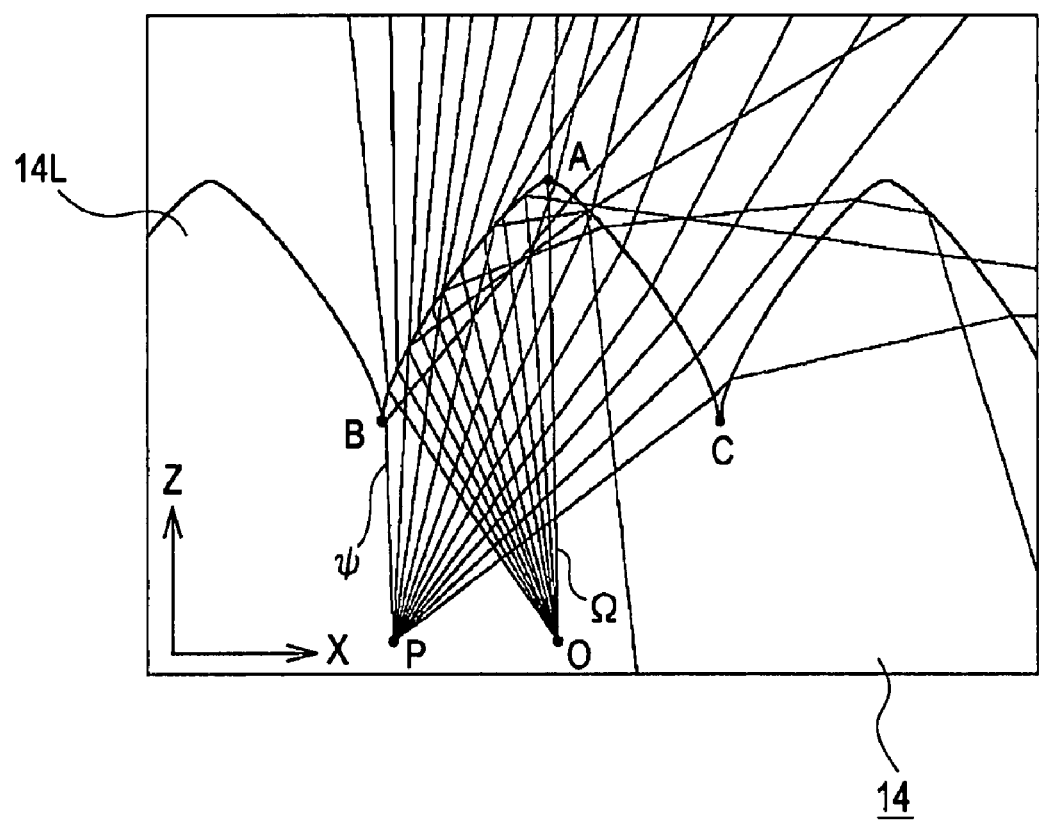
FIG. 5 is a diagram illustrating the trajectory of incident light when an aspheric cylindrical lens sheet is used as a condenser sheet.

FIG. 5 is an enlarged sectional view taken along the X and Y axes of the condenser sheet (lens sheet) 14 having the cylindrical lens members 14L shown in FIG. 2B.

The cylindrical lens member 14L shown in FIG. 5 has an aspheric shape represented by the following expression obtained by substituting R=1 [μm], K=−2, A=10−5, B=0, C=2×10−5, and D, E . . . =0 into Expression (2) mentioned above:

$$Z=X2/(1+\sqrt{(1+X2)})+10-5X4+2\times10-5X6$$

As shown in FIG. 5, part of the light flux Ω emerging from the virtual light source point O undergoes total reflection at the surface near the apex A, and is used in a supplemental manner to enhance the front luminance. Further, the light flux φ emerging from the virtual light source point P is effectively used for enhancing the front luminance as it is refracted by and transmitted through the surface between A and B and the surface between A and C.

Figure 6:
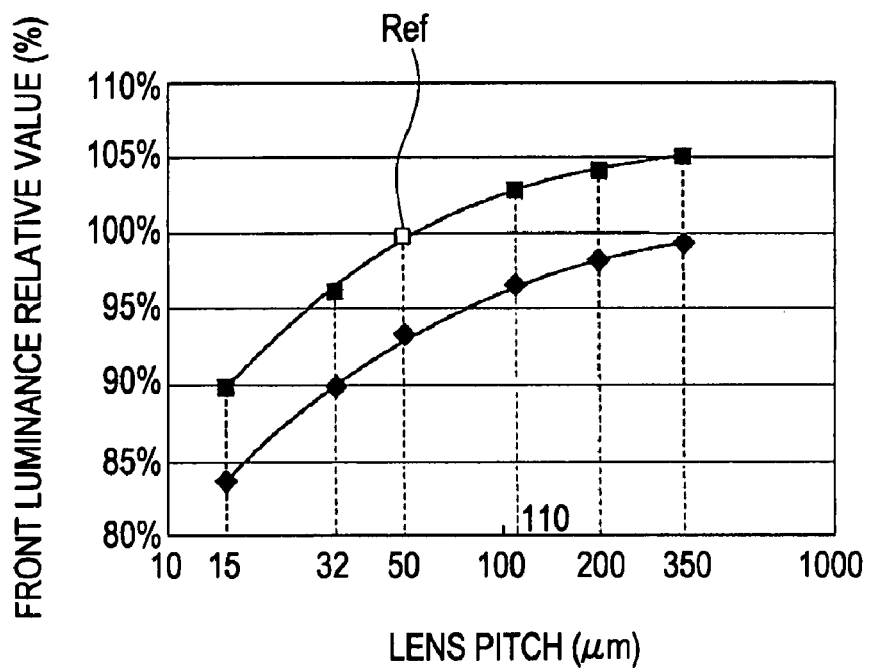
FIG. 6 is a diagram illustrating the relationship between the lens pitch of the condenser sheet and the front luminance.

The arrangement pitch of the prism members 14P or cylindrical lens members 14L of the condenser sheet 14 (hereinafter, generically referred to as "lens pitch") greatly affects the obtained front luminance. FIG. 6 shows an example of the relationship between the lens pitch of the condenser sheet 14 and the obtained front luminance. The horizontal axis represents the lens pitch [μm], and the vertical axis represents the front luminance relative value [%] relative to the luminance of a prism sheet in which prisms with an apex angle of 90 degrees are arranged at an interval of 50 μm. It should be noted that the lens pitch on the horizontal axis is presented in logarithmic scale.

FIG. 6 shows a prism sheet having the prism members 14P with an apex angle of 90 degrees, and a lens sheet having the cylindrical lens members 14L of a hyperbolic shape as represented by Expression (1) mentioned above. Generally speaking, the front luminance tends to become larger as the lens pitch becomes larger. Further, the reason why the luminance of the lens sheet is lower than that of the prism sheet under the condition of the same lens pitch is that the apex of the lens members 14L is curved as compared with that of the prism members 14P. While the obtuseness of the lens apex exerts a greater influence as the lens pitch becomes narrower and causes a significant decrease in luminance, the influence of the obtuseness of the lens apex is mitigated by enlarging the lens pitch.

As shown in FIG. 6, an improvement in luminance can be achieved when the lens pitch is large. However, there is a fear that moiré may occur due to interference with the pixel pitch of the liquid crystal display panel 2. On the other hand, although the fear of the occurrence of moiré is eliminated when the lens pitch is small, this causes a decrease in the rate of improvement in the obtained luminance.

In view of this, according to this embodiment, the lens pitch of the condenser sheet 14 is determined in accordance with the diffusion characteristics of the diffuser sheet 17 and the size of the pixel pitch of the liquid crystal display panel 2. That is, assuming that the lens pitch of the condenser sheet 14 is P [μm], the haze value of the diffuser sheet 17 is H [%], the total light transmittance is Tt [%], and the pixel pitch of the liquid crystal display panel 2 is Pp [μm], the liquid crystal display 10 according to this embodiment is configured so as to satisfy Expression (3) below.

$$(H/Tt) \cdot (Pp/P) \geq 1.6 \quad (3)$$

When this expression is solved with respect to P, the following expression results.

$$P \leq (H \cdot Pp)/(1.6Tt) \quad (4)$$

Expression (4) above represents the upper limit of the lens pitch of the condenser sheet 14. That is, if the size of the lens pitch P exceeds the value of $(H \cdot Pp)/(1.6Tt)$, as will be described in Examples later, moiré becomes liable to occur due to the interference of light between the condenser sheet 14 and the liquid crystal display panel 2, causing a deterioration of image quality. Accordingly, a high-quality image that is free from moiré can be obtained by restricting the size of the lens pitch P to a value not larger than the value of $(H \cdot Pp)/(1.6Tt)$.

As shown in FIG. 1, the diffuser sheet 17 is arranged on the light-emergent side of the condenser sheet 14. The haze value H and total light transmittance Tt of the diffuser sheet 17 are characteristics each having a value unique to each individual diffuser sheet, and are determined in accordance with the construction, kind, specifications, or the like of the diffuser sheet used. The haze value H indicates the degree of diffusion; the larger the value of H, the greater the light diffusion effect, and hence the greater the degree to which the periodicity of the distribution of light emerging from the condenser sheet 14 is mitigated. Tt represents the total transmittance of the light transmitting through the diffuser sheet. A larger value of Tt indicates a greater contribution to the luminance improvement.

In contrast, the pixel pitch Pp of the liquid crystal display panel 2 varies in accordance with the screen size or pixel count of the liquid crystal display panel 2. For instance, in the case of a 19-inch screen size, the pixel pitch is 320 μm, in the case of HD display (high-definition compatible) with a 40-inch screen size, the pixel pitch is 460 μm, and in the case of a 32-inch screen size, the pixel pitch is 510 μm. Accordingly, the upper limit of the lens pitch of the condenser sheet 14 becomes larger in proportion to the size of the pixel pitch Pp.

Figure 7:
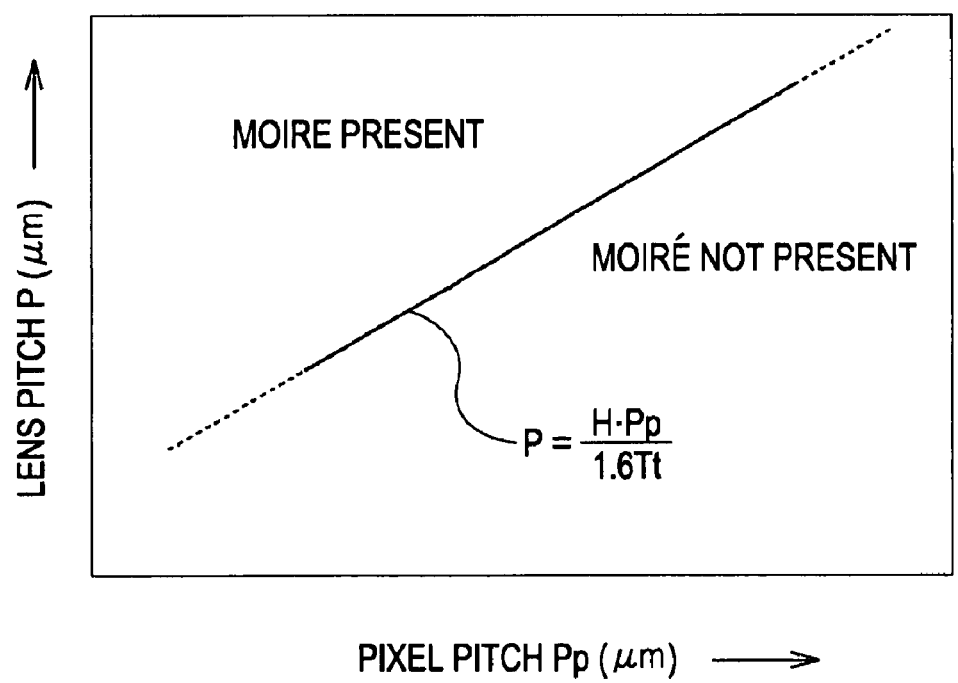
FIG. 7 is a diagram illustrating the relationship between the pixel pitch Pp and lens pitch P of a liquid crystal display panel.

FIG. 7 illustrates the relationship between the pixel pitch Pp and the lens pitch P. The upper limit of the lens pitch P is determined by the primary expression of $P = (H \cdot Pp)/(1.6Tt)$. According to this embodiment, by designing the lens pitch P on the basis of Expression (4) mentioned above, it is possible to design the condenser sheet 14 in an optimum way in accordance with the required luminance characteristics while avoiding an image quality degradation due to moiré.

While no particular limitation is placed on the upper limit of the lens pitch P of the condenser sheet 14 as it varies in accordance with the diffusion characteristics of the diffuser sheet 17 and the size of the pixel pitch Pp of the liquid crystal display panel 2, when the pixel pitch is not smaller than 320 μm and not larger 510 μm, the lens pitch P can be set to the size of, for example, not smaller than 110 μm and not larger 350 μm. As described above, although enlarging the lens pitch proves effective in improving the luminance, there is a fear that moiré may occur. The designing of the optimum lens pitch that makes it possible to avoid the occurrence of moiré while achieving an improvement in luminance can be performed on the basis of Expression (4) mentioned above from the diffusion characteristics (H, Tt) of the diffuser sheet 17 and the pixel pitch (Pp) of the liquid crystal display panel 2.

Further, with regard to the lens pitch P [μm], in the case where the cylindrical lens member 14L of the condenser sheet 14 has a hyperbolic or parabolic shape as represented by Expression (1) above, the radius of curvature R [μm] at the top apex and the conic constant K are preferably set within the numerical range of $0 < R < P$ and $-4 < K \leq -1$, more preferably $0 < R < P/2$ and $-3 < K \leq -1$, and even more preferably $0 < R < 2P/5$ and $-3 < K \leq -1$, respectively.

It should be noted that in the case where the cylindrical lens member 14L has the aspheric shape as represented by Expression (2) mentioned above, the radius of curvature R [μm] at the top apex, the conic constant K, and aspheric coefficients A, B, C ... are preferably set within the numerical range of $R \geq 0$, $K < -1$, $0 < A < 10-3$, and $0 \leq B, C ... < 10-3$, more preferably $0 < R \leq 72$, $-15 < K \leq -1$, $R - K \geq 5.0 < A, B, C ... < 10-3$, and even more preferably $0 < R \leq 30$, $-15 < K \leq -1$, $0 < A, B, C ... < 10-3$.

On the other hand, the lens pitch P of the condenser sheet 14 may not necessarily be the same in all regions, and the prism members 14P or the cylindrical lens members 14L may be arranged at a different lens pitch depending on the region. By irregularly varying the lens pitch P, a greater moiré suppression effect can be attained. In this case, the maximum value of the lens pitch P is preferably determined on the basis of Expression (4) mentioned above.

Figure 8:
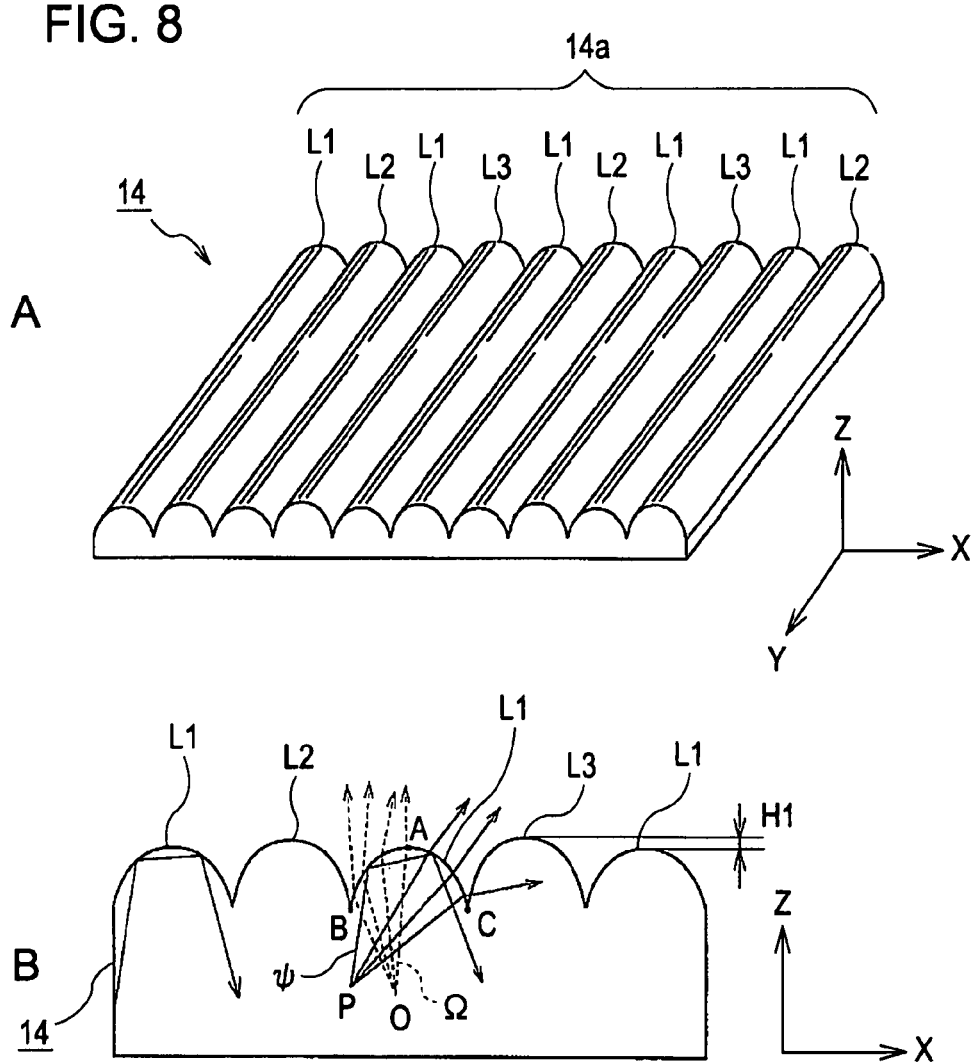
FIG. 8 is a view showing a modification of the construction in which a cylindrical sheet is used as a condenser sheet, in which part A is a schematic perspective view, and part B is a view illustrating the loci of incident light beams.

Further, the moiré prevention effect can be also attained by making the outer shape of the prism members 14P or cylindrical lens members 14L differ for each region. For example, FIG. 8 shows the condenser sheet 14 having a lens surface 14a in which cylindrical lens members L1 to L3 having different outer shapes are arranged in a periodical fashion in the order of L1, L2, L1, L3, L1, L2, ... in the positive direction of the X axis. In the illustrated example, the cylindrical lens members L1 to L3 each have the aspheric shape as represented by Expression (2) mentioned above.

Specifically, the cylindrical lens member L1 is represented as:

$$Z = X2/(25 + \sqrt{(625 + 10X2)}) + 5 \times 10 - 5X4 \text{ [μm]};$$

the cylindrical lens member L2 is represented as:

$$Z = X2/(20 + \sqrt{(400 + 20X2)}) + 6 \times 10 - 5X4 \text{ [μm]; and}$$

the cylindrical lens member L3 is represented as:

$$Z = X2/(10 + \sqrt{(100 + 40X2)}) + 6 \times 10 - 5X4 \text{ [μm]}.$$

While the cylindrical lens members L1 to L3 configured as described above are formed in the same width, the peak height differs among the cylindrical lens members L1 to L3. In the example of FIG. 8, the cylindrical lens member L2 and the cylindrical lens member L3 have equivalent peak heights, and the peak height of the cylindrical lens member L1 is set to be lower than the peak heights of the other cylindrical lens members L2, L3 by H1.

At this time, the mutual interference between light rays emerging from adjacent cylindrical lens members can be suppressed by setting the elevation difference between the above-mentioned adjacent cylindrical lens members to be not smaller than the half-wavelength ($\lambda/2$) of the above-mentioned light rays. That is, in the case of red ($\lambda$=0.6 to 0.7 µm) having the largest wavelength in the visible light region, by setting the elevation difference to be at least 1 µm or more, moiré interference can be suppressed with respect to all of the colors. In this example, the elevation difference H1 between the cylindrical lens members is set to 3 µm, for example.

As another example, FIG. 9 shows a condenser sheet 24 having a lens surface 24*a* in which cylindrical lens members L4, L5 having different outer shapes are arranged in a periodical fashion in the order of L4, L5, L4, L5, ... in the positive direction of the X axis. In the illustrated example, the cylindrical lens members L4, L5 each have the aspheric shape as represented by Expression (2) mentioned above.

Specifically, the cylindrical lens member L4 is represented as:

$$Z=X2/(10+\sqrt{(100+X2)})+10-5X4 \text{ [µm]; and}$$

the cylindrical lens member L5 is represented as:

$$Z=X2/(10+\sqrt{(100+0.8X2)})+1.75\times10-5X4 \text{ [µm]}.$$

While the cylindrical lens members L4, L5 configured as described above are formed in the same width, the peak height differs between the cylindrical lens members L4, L5. The peak height of the cylindrical lens member L4 is set to be lower than the peak height of the cylindrical lens member L5 by H2. In this example, the elevation difference H2 between the cylindrical lens members is set to 5 µm, for example.

Figure 10:
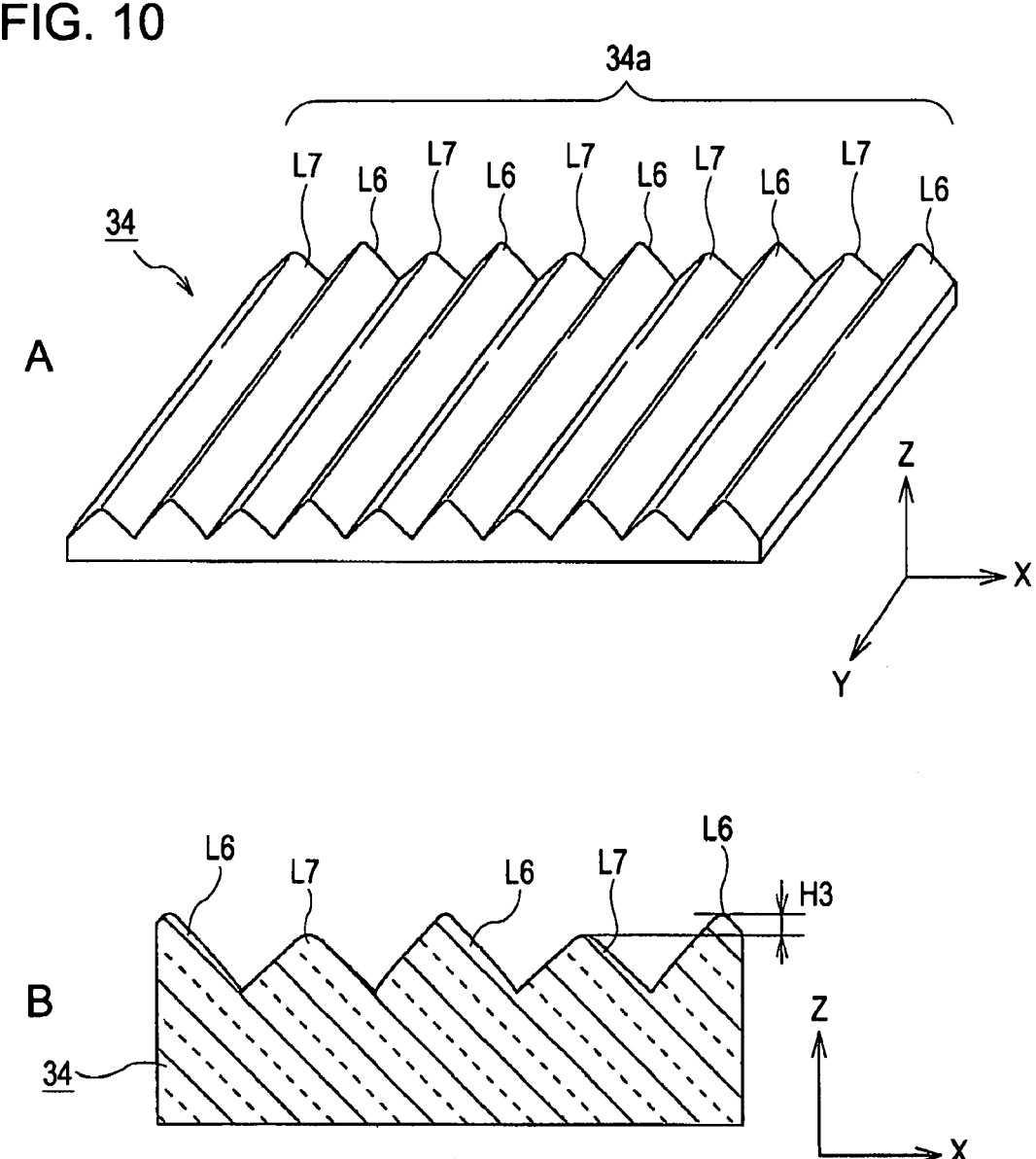
FIG. 10 is a view showing still another modification of the construction of the condenser sheet shown in FIG. 8.

As still another example, FIG. 10 shows a condenser sheet 34 having a lens surface 34*a* in which cylindrical lens members L6, L7 having different outer shapes are arranged in a periodical fashion in the order of L6, L7, L6, L7, ... in the positive direction of the X axis. In the illustrated example, the cylindrical lens members L6, L7 each have the hyperbolic or aspheric shape as represented by Expression (1), (2) mentioned above.

Specifically, the cylindrical lens member L6 is represented as:

$$Z=X2/(1+\sqrt{(1+X2)})+10-5X4 \text{ [µm]; and}$$

the cylindrical lens member L7 is represented as:

$$Z=X2/(5+\sqrt{(25+X2)})[\text{µm}].$$

While the cylindrical lens members L6, L7 configured as described above are formed in the same width, the peak height differs between the cylindrical lens members L6, L7. The peak height of the cylindrical lens member L6 is set to be lower than the peak height of the cylindrical lens member L7 by H3. In this example, the elevation difference H3 between the cylindrical lens members is set to 7 µm, for example.

While in the examples illustrated in FIGS. 8 to 10 a plurality of cylindrical lens members of different shapes forming the lens surface of the condenser sheet are arranged in a periodical fashion, they may be arranged at random.

Further, there are cases where mutual interference occurs between emerging light rays due to the length of the arrangement period of these individual cylindrical lens members. In view of this, as shown in, for example, part A of FIG. 11, in the case where a lens sheet is formed by a periodic arrangement structure composed of two kinds of lens elements La, Lb of different cross-sectional shapes, the formation width W of the lens element row constituting the periodic structure is set to 2 to 100 times, preferably 2 to 20 times of the width Lw of each of the lens elements La, Lb.

On the other hand, in the case where, as shown in part B of FIG. 11, a lens sheet is formed by a random arrangement structure composed of two kinds of lens elements La, Lb of different cross-sectional shapes, it is preferable that no more than 10, preferably 5, rows of lens elements La (or Lb) of the same construction be formed consecutively.

It should be noted that in the case where the condenser sheet according to the present application is formed by a prism sheet including prism members with a triangular cross-sectional shape, it is also possible to form this prism sheet by a plurality of kinds of prism members having different outer shapes.

Figure 12:
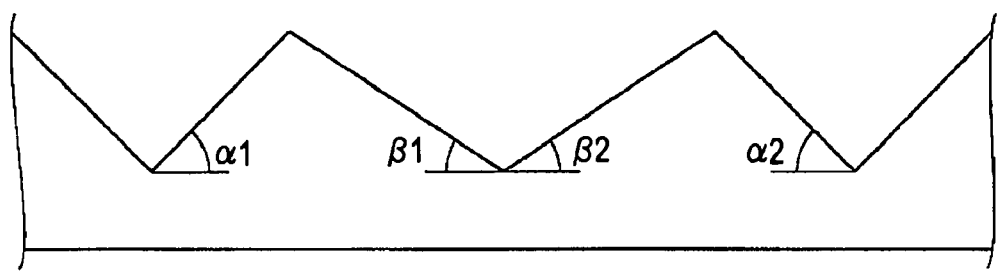
FIG. 12 is a view showing a modification of the construction in which a prism sheet is used as a condenser sheet.

For example, as shown in FIG. 12, the slope portion of each prism member is formed at different inclination angles. By forming a prism sheet by a plurality of prism members whose basic angles $\alpha$ ($\alpha1$, $\alpha2$) and $\beta$ ($\beta1$, $\beta2$) differ from each other, it is possible to achieve enlarged viewing angle while suppressing a decrease in front luminance. While the combination of the basic angles $\alpha$ and $\beta$ is not particularly limited in this case, these angles can be set within the range of, for example, 45 to 60 degrees. It should be noted that the apex angle is determined by the size of the basic angle $\alpha$, $\beta$. Further, the basic angles $\alpha$, $\beta$ of adjacent prism members can be made different from each other ($\alpha1 \neq \alpha2$, $\beta1 \neq \beta2$).

Next, assuming that the surface on which the prism members 14P or the cylindrical lens members 14L are formed is the front surface of the sheet, the other principal surface side of the condenser sheet 14, that is, the back surface side opposite to the front surface of the sheet, is a flat surface. At this time, by forming fine projections on the surface on the back side, in addition to suppressing the occurrence of flaws due to the sliding motion of the back surface side of the condenser sheet 14, it is possible to achieve an improvement in luminance characteristics by reducing the reflectance of light entering from the light source side.

While there are no particular limitations on the height of the projections provided on the back surface of the condenser sheet 14, the height of the projections is preferably 0.20 µm or more from the average central plane (JIS B0601-1994). Further, the number density of the projections having a height of 0.20 µm or more from the average central plane is preferably set within the range of 70/mm2 to 400/mm2. By setting the number density of the projections to be not smaller than 70/mm2, it is possible to mitigate the blurring of appearance due to interference with the planar portion of the diffuser plate 13 arranged on the back surface side of the condenser sheet 14. Further, by setting the number density of the projections to be not larger than 400/mm2, it is possible to suppress a decrease in the luminance of the liquid crystal display due to the provision of the projections on the back surface side of the condenser sheet.

The average interval between the projections having a height of 0.20 µm or more from the average central plane is preferably set within the range of 50 µm to 120 µm. By setting the average interval between the projections to be not smaller than 50 µm, it is possible to suppress a decrease in the luminance of the liquid crystal display due to the provision of the projections on the back surface side of the condenser sheet. Further, by setting the average interval between the projections to be not larger than 120 µm, it is possible to prevent the occurrence of flaws in the surface of the diffuser plate 13 due to contact with the back surface of the condenser sheet 14, and to mitigate the blurring of appearance due to interference with the planar portion of the diffuser plate 13.

Further, the projections provided on the back surface of the condenser sheet 14 are provided in such a way that in the state with no lens patterns such as the prism members 14P or the cylindrical lens members 14L formed, the degree of cloudiness (haze value) of the condenser sheet is preferably not larger than 60%, more preferably not larger than 20%. Further, the average inclination gradient δa of the back surface of the condenser sheet 14 provided with the projections is preferably set to be not larger than 0.25 rad.

It should be noted that when the orthogonal X, Y coordinate axes are placed on the center of a roughness curve, the axis orthogonal to the central plane is defined as the Z axis, the roughness curve is f (x, y), and the size of the reference plane is Lx, Ly, the average inclination gradient can be given by the following expression. In the expression, SM is given by Lx×Ly.

$$\delta a = \frac{1}{S_M} \int_o^{Lx} \int_o^{Ly} \sqrt{\left(\frac{\partial f}{\partial x}\right)^2 + \left(\frac{\partial f}{\partial y}\right)^2} \, dx \, dy \qquad \text{[Expression 1]}$$

FIG. 13 shows the relationship between the degree of cloudiness (haze value) of the sheet, the average inclination gradient of the sheet back surface, and the front luminance of the liquid crystal display in the state with no lens patterns formed, with respect to various samples in which the above-mentioned projections are provided in various modified forms on the back surface of the condenser sheet. The front luminance is expressed as a value relative to the luminance value in Sample S1. By setting the haze value to be not larger than 60%, and the average inclination gradient to be not larger than 0.25 rad, it is possible to suppress a decrease in the luminance of the liquid crystal display due to the provision of the projections on the back surface side of the condenser sheet 14.

Further, while the average roughness of the projections provided on the back surface of the condenser sheet 14 is not particularly limited, the projections are preferably provided in such a way that the ten-point average roughness SRz of the projections is within the range of 1 μm to 15 μm. By setting the value of the ten-point average roughness SRz of the projections to be not smaller than 1 μm, it is possible to prevent flaws from being generated in the surface of the diffuser plate 13 due to contact with the back surface of the condenser sheet 14, and to mitigate the blurring of appearance due to interference with the planar portion of the diffuser plate 13. Further, by setting the value of the ten-point average roughness SRz of the projections to be not larger than 15 μm, it is possible to suppress a decrease in the luminance of the liquid crystal display due to the provision of the projections on the back surface side of the condenser sheet 14.

Next, a method of manufacturing the condenser sheet 14 will be described. In this embodiment, the condenser sheet 14 is prepared by the melt extrusion molding method. However, the manufacturing method is not limited to this; it is also possible to form irregularities such as the prism members or cylindrical members on the sheet by heat press method, transferring method using ultraviolet-curing resin, or the like.

Figure 14:
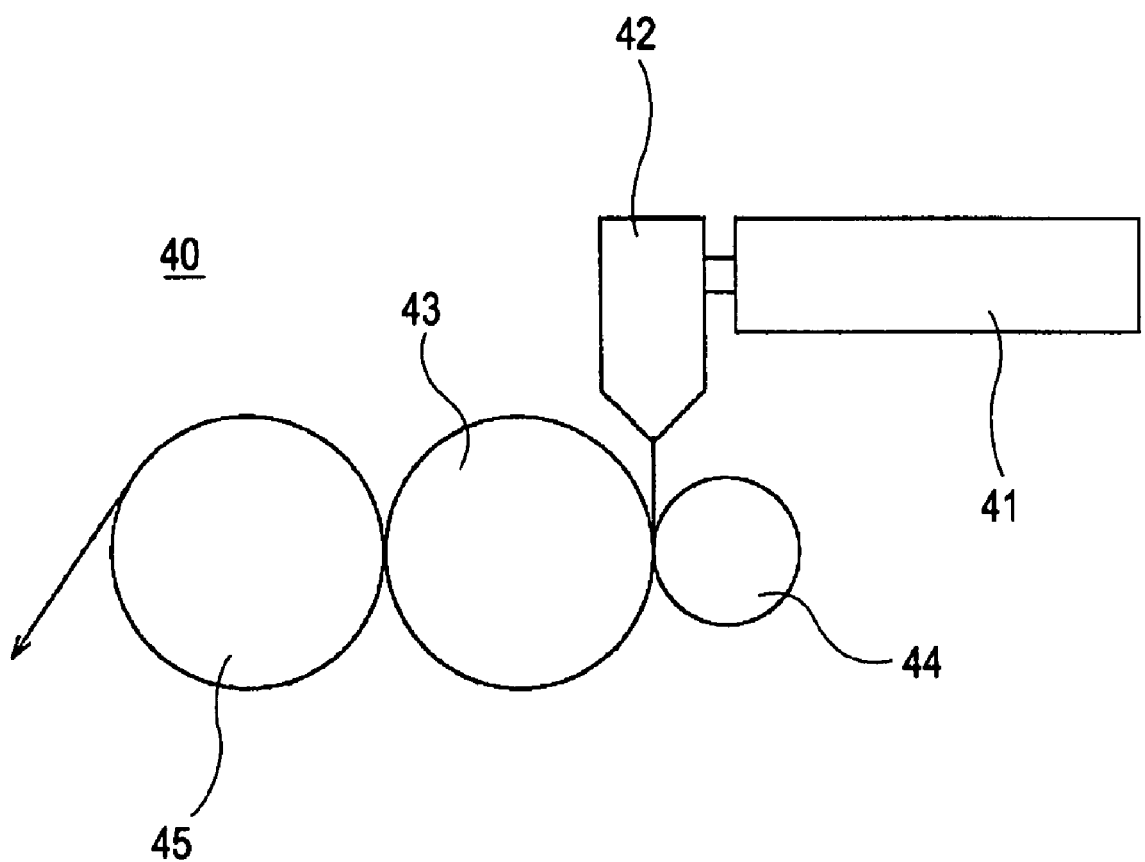
FIG. 14 is a schematic diagram of a molding device for preparing the condenser sheet by melt-extrusion molding.

FIG. 14 is a schematic diagram of an extrusion-sheet precision-molding device 40 used for manufacturing the condenser sheet 14 according to this embodiment. The extrusion-sheet precision-molding device 40 includes an extruder 41, a T-die 42, a forming roll 43, an elastic roll 44, and a cooling roll 45.

The extruder 41 melts a resin material supplied from a hopper (not shown), and supplies the molten resin material to the T-die 42. The T-die 42 is a die having an opening shaped like the number 1, and discharges the resin material supplied from the extruder 41 after expanding it into the width of a sheet to be formed.

The forming roll 43 has a cylindrical configuration, and can be rotationally driven about its center axis as the rotation axis. Further, the forming roll 43 is formed so that it can be cooled. Specifically, the forming roll 43 has one or two or mote channels for flowing a cooling medium therein. An oil medium, for example, is used as the cooling medium, and the temperature of this oil medium is allowed to change between, for example, 90° C. and 270° C.

The cylindrical surface of the forming roll 43 is provided with an engraving for transferring irregularity patterns onto one principal surface of the sheet discharged from the T-die 42. This engraving is formed by, for example, fine irregularities for transferring the prism members 14P or cylindrical lens members 14L shown in FIG. 2A, 2B onto the sheet. These irregularities are formed by, for example, precision cutting with a diamond cutting tool. Further, the engraving is formed in the circumferential or width direction (height direction) of the forming roll 43 having a cylindrical configuration.

The elastic roll 44 has a cylindrical configuration, and can be rotationally driven about its center axis as the rotation axis. Further, the surface of the elastic roll 44 is capable of elastic deformation. Upon nipping the sheet by the forming roll 43 and the elastic roll 44, the surface in contact with the forming roll 43 is crashed.

The elastic roll 44 is covered by a seamless tube made of, for example, Ni plating or the like. An elastic member for enabling the surface of the elastic roll 44 to undergo elastic deformation is provided inside the elastic roll 44. The construction and material of the elastic roll 44 are not limited as long as they allow the surface of the elastic roll 44 to undergo elastic deformation upon contact with the forming roll 43 under a predetermined pressure. As the material of the elastic roll 44, for example, a rubber material, a metal or composite material, or the like may be used. Further, the elastic roll 44 used is not limited to a roll-shaped one but a belt-shaped one may also be used.

The cooling roll 45 has a cylindrical configuration, and can be rotationally driven about its center axis as the rotation axis. The cooling roll 45 is formed so that it can be cooled. Specifically, the cooling roll 45 has one or two or mote channels for flowing a cooling medium therein. Water, for example, may be used as the cooling medium. Further, using a pressurized-hot-water type temperature regulator (not shown), the base temperature is set to, for example, 15° C. It should be noted that an oil temperature regulator may be used as the temperature regulator.

In the extrusion-sheet precision-molding device 40 constructed as described above, first, a resin material is molten by the extruder 41 and sequentially supplied to the T-die 42, and a sheet is continuously discharged from the T-die 42.

Next, the sheet discharged from the T-die 42 is nipped by the forming roll 43 and the elastic roll 44. This causes the engraving on the forming roll 43 to be transferred onto the surface of the sheet. At this time, the surface temperature of the forming roll 43 is maintained within the temperature range of the glass transition temperature Tg (° C.) of the resin material+20° C. to Tg+45° C., and the surface temperature of the elastic roll 44 is maintained within the temperature range of 20° C. to Tg. By maintaining the surface temperatures of the forming roll 43 and elastic roll 44 within the above-described temperature ranges, the engraving can be transferred onto the sheet in a satisfactory manner. Further, the temperature of the resin material when transferring the engraving is preferably in the range of Tg+50° C. to Tg+230° C., and more preferably Tg+80° C. to Tg+200° C. By maintaining the resin temperature within the above-described temperature range, the engraving can be transferred onto the sheet in a satisfactory manner.

Then, the sheet is separated from the forming roll 43 by the cooling roll 45 while nipping the sheet by the forming roll 43 and the cooling roll 45 to suppress flapping of the sheet. At this time, the surface temperature of the cooling roll 45 is maintained within the temperature range not higher than Tg. By maintaining the surface temperature of the cooling roll 45 within such a temperature range, and also nipping the sheet by the forming roll 43 and the cooling roll 45 to suppress flapping of the sheet, the sheet can be separated from the forming roll 43 in a satisfactory manner. Further, the temperature of the resin material when releasing the sheet is preferably not lower than Tg, more preferably Tg+20° C. to Tg+85° C., and even more preferably Tg+30° C. to Tg+60° C. By maintaining the temperature of resin within the above-described temperature range, and also nipping the sheet by the forming roll 43 and the cooling roll 45 to suppress flapping of the sheet, the sheet can be separated from the forming roll 43 in a satisfactory manner.

Through the above-mentioned operations, the desired lens sheet or prism sheet as the condenser sheet 14 can be obtained.

At least one kind of transparent thermoplastic resin is used for forming the condenser sheet 14. Considering the function of controlling the emerging direction of light, as the thermoplastic resin, one having a refractive index of 1.4 or more is preferably used. Examples of such resin include acrylate resin such as polycarbonate resin or polymethyl methacrylate resin, polyester resin or amorphous copolymer polyester resin such as polyethylene terephthalate, polystyrene resin, and polyvinyl chloride resin. Further, considering the transferability of lens patterns by the melt extrusion method, the melt temperature in the vicinity of the molding temperature is preferably not lower than 1,000 Pa and not higher than 10,000 Pa.

Further, it is preferable that at least one kind of mold releasing agent be contained in the thermoplastic resin. Such inclusion of a mold releasing agent makes it possible to prevent the separation line from being formed in the condenser sheet 14 by adjusting the adhesion between the forming roll 43 and the sheet at the time of separating the sheet from the forming roll 43. The content of the molding releasing agent to be added to the thermoplastic resin is preferably set within the range of 0.02 wt % to 0.4 wt %. If the content is less than 0.02 wt %, the releasability deteriorates, causing the separation line to be formed in the condenser sheet 14. On the other hand, a content in excess of 0.4 wt % leads to excessive releasability, causing the deformation of the shape before the transparent thermoplastic resin becomes solidified.

Further, it is preferable that at least one kind of ultraviolet absorber or light stabilizer be contained in the thermoplastic resin. Such inclusion of ultraviolet absorber or light stabilizer makes it possible to suppress a change in color due to the radiation of light from the light source.

The content of the ultraviolet absorber or light stabilizer to be added to the thermoplastic resin is preferably set within the range of 0.02 wt % to 0.4 wt %. If the content is less than 0.02 wt %, it is impossible to suppress the change in color. On the other hand, if the content exceeds 0.4 wt %, the condenser sheet 14 takes on a yellowish color.

Further, other than the above-described molding releasing agent, the ultraviolet absorber, and light stabilizer, it is also possible to add additives such as antioxidant, antistat, colorant, plasticizer, compatibilizer, and fire retardant. It should be noted, however, that since most of the additives induces the generation of gas upon heating at the time of melt extrusion of the T-die 42 or the like, causing a deterioration of the film-formation property or working atmosphere. Hence, the total amount of the additives is preferably small, and their added content with respect to the thermoplastic resin is preferably set to be not larger than 2 wt %.

EXAMPLES

While Examples will be described below, the present application is not limited to the Examples below.

A plurality of diffuser sheets having different diffusion characteristics were prepared, and liquid crystal displays were constructed by combining these diffuser sheets with a condenser sheet having a predetermined lens pitch. The front luminance, the horizontal viewing angle (VAh), and the vertical viewing angle (VAv) at this time were measured, and it was checked whether or not moiré had occurred. Further, using "DBEFD" (product name) manufactured by 3M in which a reflecting polarizer is sandwiched by a diffusion function layer instead of a diffuser sheet, liquid crystal displays were constructed by combining "DBEFD" with a condenser sheet having a predetermined lens pitch; the front luminance, the horizontal viewing angle (VAh), and the vertical viewing angle (VAv) at this time were measured, and it was checked whether or not moiré had occurred. It should be noted that the condenser sheet is placed so that the ridge direction of the prism members or cylindrical lens members is parallel to the horizontal direction of the screen.

FIG. 15 shows the diffusion characteristics of the respective diffuser sheets thus prepared, that is, the haze value (H), total light transmittance (Tt), diffused light (Td), linear transmission amount (Tp), and value of "H/Tt" of each diffuser sheet thereof.

The haze value (H) of the diffuser sheet was measured using the haze/transmittance meter HM-150 manufactured by MURAKAMI COLOR RESEARCH LABORATORY Of the transmitted light passing through a test piece, the percentage of transmitted light deviated by 2.5° or more from incident light by backward scattering (in which the diffusing surface is located on the emergent side) was measured. The measurement of the haze value was performed in accordance with JIS-K-7136 except for the installation method for the test piece. It should be noted that as in the measurement of the haze value, the measurements of the total light transmittance (Tt), linear transmission amount (Tp), and diffused light (Td) that will be described later were also performed on the basis of backward-scattering light.

The total light transmittance (Tt) of the diffuser sheet was measured using the haze/transmittance meter HM-150 manufactured by MURAKAMI COLOR RESEARCH LABORATORY Of the transmitted light passing through a test piece, the percentage of the total transmitted light flux relative to the parallel incident light flux was measured (in accordance with JIS-K-7361).

The linear transmission amount (Tp) was measured using the haze/transmittance meter HM-150 manufactured by MURAKAMI COLOR RESEARCH LABORATORY Of the transmitted light passing through a test piece, the percentage of transmitted light that falls within the range of less than 2.5° with respect to the parallel incident light flux was measured (in accordance with the JIS-K-7136 haze measurement method).

The diffused light (Td) is expressed as a transmittance obtained by subtracting the transmittance of a linear component from the total light transmittance measured using the haze/transmittance meter HM-150 manufactured by MURAKAMI COLOR RESEARCH LABORATORY.

It should be noted that "DBEFD" in the sample of the diffuser sheet is the product name of a diffusion reflection type polarization separating element manufactured by 3M.

For reference, the haze value, total transmittance, diffused light, linear transmission amount, and value of "H/Tt" of each diffuser sheet sample measured on the basis of forward scattering light normally prescribed by the JIS are shown in FIG. 16.

[Prism Sheet, Pixel Pitch 320 μm]

As the condenser sheet, prism sheets (lens pitch P: 15 μm, 32 μm, 50 μm, 110 μm, 200 μm, 350 μm) having prism members with an isosceles triangular cross-section arranged on the light-emergent surface were prepared by melt extrusion molding of polycarbonate resin. Liquid crystal displays were constructed by combining these prism sheets with the various diffuser sheets (excluding "DBEFD") having the diffusion characteristics shown in FIG. 16 and a liquid crystal display panel with a pixel pitch Pp of 320 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 17 and 18.

Here, the evaluation on the occurrence of moiré was made in the following manner.

In a dark room, white display was video-input to the liquid crystal displays of the respective constructions, and the occurrence of moiré was visually observed in the front and oblique directions. "O" in the column of moiré evaluation indicates that no moiré occurred, and "x" indicates that moiré occurred.

The measurement of the front luminance was made as follows.

In a dark room, white display was video-input to the liquid crystal displays of the respective constructions, and after two hours of illumination, the luminance was measured by installing "CS-1000", a spectroradiometer manufactured by Konica Minolta, at a location of 500 mm from the panel surface. The measurement was performed three times, and the average value of these measurements was taken as the measurement value.

Then, the measurement of the viewing angle wad made as follows.

In a dark room, white display was video-input to the liquid crystal displays of the respective constructions, and after two hours of illumination, the evaluation on the viewing angle was made by installing a luminance/chromaticity meter ("EZ Contrast" manufactured by ELDIM) on the panel surface. The angles at which the front luminance becomes half in the horizontal direction with respect to the long side of the panel and in the direction perpendicular to this direction were read and respectively defined as the horizontal viewing angle (VAh) and the vertical viewing angle (VAv).

It should be noted that the measurement value of the front luminance is expressed as a value relative to the front luminance obtained with a liquid crystal display constructed by the combination of a prism sheet "Thick BEFIII" (product name) manufactured by 3M as the condenser sheet, "diffuser sheet 2" of FIG. 16, and a liquid crystal display panel with a pixel pitch of 320 μm. The value of "(H/Tt)·(Pp/P)", the results of evaluation on the occurrence of moiré, the front luminance measurement value, and the viewing angle measurement value with this liquid crystal display are shown in FIGS. 29 and 30. The luminance characteristics of "Thick BEFIII" mentioned above correspond to the point denoted by "Ref" in FIG. 6.

As shown in FIG. 17, in the case where the pixel pitch Pp of the liquid crystal display panel is 320 μm, no moiré was observed in the liquid crystal displays using the prism sheets with lens pitches P of 15 μm, 32 μm, and 50 μm.

Further, in the case where the lens pitch P is 110 μm, moiré was observed in the samples using "diffuser sheet 10" and "adhesive diffusion layer 3". Further, in the case where the lens pitch P is 200 μm, moiré was observed in the samples using "diffuser sheet 8", "diffuser sheet 9", "diffuser sheet 10", and "adhesive diffusion layer 3". Further, in the case where the lens pitch P is 350 μm, no moiré was observed only in the sample using "diffuser sheet 1".

It is understood from the results shown in FIG. 17 that with a liquid crystal display including a liquid crystal display panel with a pixel pitch of 320 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more.

On the other hand, the results as shown in FIG. 18 were obtained with regard to the front luminance and the viewing angle characteristics. With regard to the front luminance characteristics, in particular, it is observed that the front luminance characteristics are enhanced as the value of the lens pitch P becomes larger. This is because the area of the prism slope portion increases by enlarging the lens pitch, thereby improving the light-condensing characteristics to achieve enhanced front luminance characteristics.

[Prism Sheet, Pixel Pitch 460 μm]

As the condenser sheet, prism sheets (lens pitch P: 50 μm, 110 μm, 200 μm, 350 μm) having prism members with an isosceles triangular cross-section arranged on the light-emergent surface were prepared by melt extrusion molding of polycarbonate resin. Liquid crystal displays were constructed by combining these prism sheets with the various diffuser sheets (excluding "DBEFD") having the diffusion characteristics shown in FIG. 16 and a liquid crystal display panel with a pixel pitch Pp of 460 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 19 and 20.

As shown in FIG. 19, in the case where the pixel pitch Pp of the liquid crystal display panel is 460 μm, no moiré was observed in the liquid crystal displays using the prism sheets with a lens pitch P of 50 μm.

Further, in the case where the lens pitch P is 110 μm, moiré was observed in the sample using "diffuser sheet 10". Further, in the case where the lens pitch P is 200 μm, moiré was observed in the samples using "diffuser sheet 9", "diffuser sheet 10", and "adhesive diffusion layer 3". Further, in the case where the lens pitch P is 350 μm, moiré was observed in the samples using "diffuser sheet 7", "diffuser sheet 8" "diffuser sheet 9", "diffuser sheet 10", "adhesive diffusion layer 2", and "adhesive diffusion layer 3".

It is understood from the results shown in FIG. 19 that with a liquid crystal display including a liquid crystal display panel with a pixel pitch of 460 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more. Further, in this example as well, it is observed that the front luminance characteristics are enhanced as the value of the lens pitch P becomes larger (FIG. 20).

[Prism Sheet, Pixel Pitch 510 μm]

As the condenser sheet, prism sheets (lens pitch P: 50 μm, 110 μm, 200 μm, 350 μm) having prism members with an isosceles triangular cross-section arranged on the light-emergent surface were prepared by melt extrusion molding of polycarbonate resin. Liquid crystal displays were constructed by combining these prism sheets with the various diffuser sheets (excluding "DBEFD") having the diffusion characteristics shown in FIG. 16 and a liquid crystal display panel with a pixel pitch Pp of 510 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 21 and 22.

As shown in FIG. 21, in the case where the pixel pitch Pp of the liquid crystal display panel is 510 μm, no moiré was observed in the liquid crystal displays using the prism sheets with lens pitches P of 50 μm and 110 μm.

Further, in the case where the lens pitch P is 200 μm, moiré was observed in the samples using "diffuser sheet 9", "diffuser sheet 10", and "adhesive diffusion layer 3". Further, in the case where the lens pitch P is 350 μm, moiré was observed in the samples using "diffuser sheet 7", "diffuser sheet 8", "diffuser sheet 9", "diffuser sheet 10", "adhesive diffusion layer 2", and "adhesive diffusion layer 3".

It is understood from the results shown in FIG. 21 that with a liquid crystal display including a liquid crystal display panel with a pixel pitch of 510 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more. Further, in this example as well, it is observed that the front luminance characteristics are enhanced as the value of the lens pitch P becomes larger (FIG. 22).

[Hyperbolic Cylindrical Lens Sheet, Pixel Pitch 320 μm]

As the condenser sheet, lens sheets (lens pitch P: 15 μm, 32 μm, 50 μm, 110 μm, 200 μm, 350 μm) in which cylindrical lens members of a hyperbolic configuration represented by Expression (1) mentioned above are arranged on the light-emergent surface were prepared by melt extrusion molding of polycarbonate resin.

The shapes of the lenses with the respective lens pitches are similar to each other, and lens design was performed in the following manner with the shape of the lens having a pitch of 50 μm as a reference.

Lens pitch P: 15 μm $$Z = 0.3(X/0.3)2/(5+\sqrt{(25+(X/0.3)2)})$$

Lens pitch P: 32 μm $$Z = 0.64(X/0.64)2/(5+\sqrt{(25+(X/0.64)2)})$$

Lens pitch P: 50 μm $$Z = X2/(5+\sqrt{(25+X2)})$$

Lens pitch P: 110 μm $$Z = 2.2(X/2.2)2/(5+\sqrt{(25+(X/2.2)2)})$$

Lens pitch P: 200 μm $$Z = 2.2(X/4)2/(5+\sqrt{(25+(X/4)2)})$$

Lens pitch P: 350 μm $$Z = 7(X/7)2/(5+\sqrt{(25+(X/7)2)})$$

Liquid crystal displays were constructed by combining these prism sheets with the various diffuser sheets (excluding "DBEFD") having the diffusion characteristics shown in FIG. 16 and a liquid crystal display panel with a pixel pitch Pp of 320 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 23 and 24.

As shown in FIG. 23, in the case where the pixel pitch Pp of the liquid crystal display panel is 320 μm, no moiré was observed in the liquid crystal displays using the prism sheets with lens pitches P of 15 μm, 32 μm, and 50 μm.

Further, in the case where the lens pitch P is 110 μm, moiré was observed in the samples using "diffuser sheet 10" and "adhesive diffusion layer 3". Further, in the case where the lens pitch P is 200 μm, moiré was observed in the samples using "diffuser sheet 8", "diffuser sheet 9", "diffuser sheet 10", and "adhesive diffusion layer 3". Further, in the case where the lens pitch P is 350 μm, no moiré was observed only in the sample using "diffuser sheet 1".

It is understood from the results shown in FIG. 23 that with a liquid crystal display including a liquid crystal display panel with a pixel pitch of 320 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more.

On the other hand, the results as shown in FIG. 24 were obtained with regard to the front luminance and the viewing angle characteristics. With regard to the front luminance characteristics, in particular, it is observed that the front luminance characteristics are enhanced as the value of the lens pitch P becomes larger. This is because the area of the lens formation surface increases by enlarging the lens pitch, thereby improving the light-condensing characteristics to achieve enhanced front luminance characteristics.

[Hyperbolic Cylindrical Lens Sheet, Pixel Pitch 460 μm]

As the condenser sheet, lens sheets (lens pitch P: 50 μm, 110 μm, 200 μm, 350 μm) in which prism members of a hyperbolic configuration represented by Expression (1) mentioned above are arranged on the light-emergent surface were prepared by melt extrusion molding of polycarbonate resin. The shapes of the lenses with the respective lens pitches are similar to each other, and lens design was performed in the following manner with the shape of the lens having a pitch of 50 μm as a reference.

Lens pitch P: 50 μm $$Z = X2/(5+\sqrt{(25+X2)})$$

Lens pitch P: 110 μm $$Z = 2.2(X/2.2)2/(5+\sqrt{(25+(X/2.2)2)})$$

Lens pitch P: 200 μm $$Z = 4(X/4)2/(5+\sqrt{(25+(X/4)2)})$$

Lens pitch P: 350 μm $$Z = 7(X/7)2/(5+\sqrt{(25+(X/7)2)})$$

Liquid crystal displays were constructed by combining these prism sheets with the various diffuser sheets (excluding "DBEFD") having the diffusion characteristics shown in FIG. 16 and a liquid crystal display panel with a pixel pitch Pp of 460 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 25 and 26.

As shown in FIG. 25, in the case where the pixel pitch Pp of the liquid crystal display panel is 460 μm, no moiré was observed in the liquid crystal displays using the prism sheets with a lens pitch P of 50 μm.

Further, in the case where the lens pitch P is 110 μm, moiré was observed in the samples using "diffuser sheet 10". Further, in the case where the lens pitch P is 200 μm, moiré was observed in the samples using "diffuser sheet 9", "diffuser sheet 10", and "adhesive diffusion layer 3". Further, in the case where the lens pitch P is 350 μm, moiré was observed in the samples using "diffuser sheet 7", "diffuser sheet 8", "diffuser sheet 9", "diffuser sheet 10", "adhesive diffusion layer 2", and "adhesive diffusion layer 3".

It is understood from the results shown in FIG. 25 that with a liquid crystal display including a liquid crystal display panel with a pixel pitch of 460 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more. Further, in this example as well, it is observed that the front luminance characteristics are enhanced as the value of the lens pitch P becomes larger (FIG. 26).

[Hyperbolic Cylindrical Lens Sheet, Pixel Pitch 510 μm]

As the condenser sheet, lens sheets (lens pitch P: 50 μm, 110 μm, 200 μm, 350 μm) in which prism members of a hyperbolic configuration represented by Expression (1) mentioned above are arranged on the light-emergent surface were prepared by melt extrusion molding of polycarbonate resin. The shapes of the lenses with the respective lens pitches are similar to each other, and lens design was performed in the following manner with the shape of the lens having a pitch of 50 μm as a reference.

Lens pitch P: 50 μm $$Z=X2/(5+\sqrt{(25+X2)})$$

Lens pitch P: 110 μm $$Z=2.2(X/2.2)2/(5+\sqrt{(25+(X/2.2)2)})$$

Lens pitch P: 200 μm $$Z=4(X/4)2/(5+\sqrt{(25+(X/4)2)})$$

Lens pitch P: 350 μm $$Z=7(X/7)2/(5+\sqrt{(25+(X/7)2)})$$

Liquid crystal displays were constructed by combining these prism sheets with the various diffuser sheets (excluding "DBEFD") having the diffusion characteristics shown in FIG. 16 and a liquid crystal display panel with a pixel pitch Pp of 510 μm. The value of "(H/Tt)·(Pp/P)", the results of evaluation on the occurrence of moiré, the front luminance measurement value, and the viewing angle measurement value with each of the liquid crystal displays constructed as described above are shown in FIGS. 27 and 28.

As shown in FIG. 27, in the case where the pixel pitch Pp of the liquid crystal display panel is 510 μm, no moiré was observed in the liquid crystal displays using the prism sheets with lens pitches P of 50 μm and 110 μm.

Further, in the case where the lens pitch P is 200 μm, moiré was observed in the samples using "diffuser sheet 9", "diffuser sheet 10", and "adhesive diffusion layer 3". Further, in the case where the lens pitch P is 350 μm, moiré was observed in the samples using "diffuser sheet 7", "diffuser sheet 8" "diffuser sheet 9", "diffuser sheet 10", "adhesive diffusion layer 2", and "adhesive diffusion layer 3".

It is understood from the results shown in FIG. 27 that with a liquid crystal display including a liquid crystal display panel with a pixel pitch of 510 μm, although moiré becomes liable to occur as the lens pitch of the condenser sheet becomes larger, the occurrence of moiré is suppressed in the case of using the combination of diffuser sheet and condenser sheet in which the value of "(H/Tt)·(Pp/P)" becomes 1.6 or more. Further, in this example as well, it is observed that the front luminance characteristics are enhanced as the value of the lens pitch P becomes larger (FIG. 28).

As shown in FIGS. 17 to 28, irrespective of whether the condenser sheet used is a prism sheet or a hyperbolic cylindrical lens sheet, equivalent evaluation results were obtained with regard to the occurrence of moiré. This means that with regard to the lens sheet, whether or not moiré occurs is little affected by the lens configuration but depends mostly on the lens pitch.

Further, as compared with the hyperbolic cylindrical lens sheet, the prism sheet provides higher luminance irrespective of the lens pitch. The reason for this is as described above with reference to FIG. 6. On the other hand, as compared with the prism sheet, a larger viewing angle was obtained with the hyperbolic cylindrical lens sheet irrespective of the lens pitch. This is due to the difference in the shape of the lens apex.

[Reflection Type Polarizing Element with Diffusion Function]

Next, using the reflection type polarizing element with diffusion function "DBEFD" shown in FIG. 16 as the diffuser sheet, liquid crystal displays were constructed by combining this with condenser sheets having various lens pitches and liquid crystal display panels having various pixel pitches. The value of "(H/Tt)·(Pp/P)", the results of evaluation on the occurrence of moiré, the front luminance measurement value, and the viewing angle measurement value at this time are shown in FIGS. 31 and 32.

It should be noted that in the examples shown in FIGS. 31 and 32, in "sample 26-1" to "sample 26-12", a prism sheet is used as the condenser sheet, and in "sample 26-13" to "sample 26-24", a hyperbolic cylindrical lens sheet is used as the condenser sheet.

As shown in FIG. 31, moiré was observed in the case where the pixel pitch is 320 μm and the lens pitch is 350 μm. The value of "(H/Tt)·(Pp/P)" at this time was 1.59.

By using a reflection type polarization separating element with diffusion function for the diffuser sheet, a large improvement can be achieved in terms of front luminance. A reflection type polarization separating element is widely known as a luminance improving film, and the use of this element makes it possible to enhance the front luminance of a liquid crystal display.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention claimed is:

1. A liquid crystal display comprising:
    a liquid crystal display panel;
    a light source arranged on a back surface side of the liquid crystal display panel;
    an optical sheet with a light-condensing property arranged between the liquid crystal display panel and the light source, the optical sheet having a number of projections arranged continuously on a principal surface of the optical sheet; and
    a diffuser sheet arranged between the liquid crystal display panel and the optical sheet,
    wherein when a width of the projections of the optical sheet is P [μm], a haze value of the diffuser sheet is H [%], a total light transmittance of the diffuser sheet is Tt [%], and a pixel pitch of the liquid crystal display panel is Pp [μm], the following relationship is satisfied:

$(H/Tt) \cdot (Pp/P) \geq 1.6$, $320 \text{ μm} \leq Pp$, and $110 \text{ μm} \leq P$.

2. The liquid crystal display according to claim 1, wherein: the following relationship is satisfied:

$110 \text{ μm} \leq P \leq 350 \text{ μm}$.

3. The liquid crystal display according to claim 1, wherein: the haze value is a measurement value of backward scattering.

4. The liquid crystal display according to claim 1, wherein: the light source is any one of a direct type backlight unit, and an edge light type backlight unit.

5. The liquid crystal display according to claim 1, wherein: the light source is any one of a fluorescent lamp, a light-emitting diode and an electroluminescent.

6. The liquid crystal display according to claim 1, wherein: the diffuser sheet includes a reflecting polarizer.

7. An optical sheet manufacturing method for manufacturing an optical sheet with a light-condensing property used in combination with a liquid crystal display panel and a diffuser sheet, the optical sheet having a number of projections arranged continuously on a principal surface of the optical sheet, comprising:
determining an upper limit of a width (P) of the projections on the basis of the following expression, where a width of the projections is P [μm], a haze value of the diffuser sheet is H [%], a total light transmittance of the diffuser sheet is Tt [%], and a pixel pitch of the liquid crystal display panel is Pp [μm]:

$(H/Tt) \cdot (Pp/P) \geq 1.6$, $320 \text{ μm} \leq Pp$, and $110 \text{ μm} \leq P$.

8. The optical sheet manufacturing method for manufacturing an optical sheet according to claim 7, wherein: the following relationship is satisfied:

$110 \text{ μm} \leq P \leq 350 \text{ μm}$.

9. The optical sheet manufacturing method for manufacturing an optical sheet according to claim 7, wherein: the optional sheet are formed by melt extrusion molding method.

10. The optical sheet manufacturing method for manufacturing an optical sheet according to claim 7, wherein: the optical sheet is formed by integral molding.

11. An optical sheet with a light-condensing property used in combination with a liquid crystal display panel and a diffuser sheet, the optical sheet having a number of projections arranged continuously on a principal surface of the optical sheet,
wherein when a width of the projections is P [μm], a haze value of the diffuser sheet is H [%], a total light transmittance of the diffuser sheet is Tt [%], and a pixel pitch of the liquid crystal display panel is Pp [μm], the following relationship is satisfied:

$(H/Tt) \cdot (Pp/P) \geq 1.6$, $110 \text{ μm} \leq P$, and $320 \text{ μm} \leq Pp$.

12. The optical sheet according to claim 11, wherein: the following relationship is satisfied:

$110 \text{ μm} \leq P \leq 350 \text{ μm}$.

13. The optical sheet according to claim 12, wherein: the following relationship is satisfied:

$200 \text{ μm} \leq P \leq 350 \text{ μm}$.

14. The optical sheet according to claim 11, wherein: the haze value is a measurement value of backward scattering.

15. The optical sheet according to claim 11, wherein: the optical sheet is formed by at least one kind of transparent thermoplastic resin.

16. The optical sheet according to claim 11, wherein: the optical sheet is formed by a resin having a refractive index of 1.4 or more.

17. The optical sheet according to claim 11, wherein: the optical sheet is formed by polycarbonate resin, acrylate resin, polyester resin, amorphous copolymer polyester resin, polystyrene resin or polyvinyl chloride resin.

18. The optical sheet according to claim 11, wherein: the projections are prism members of a triangular cross-sectional shape.

19. The optical sheet according to claim 11, wherein: the projections have a hyperbolic or parabolic surface; and when a Z axis is taken parallel to a normal direction of the optical sheet, and an X axis is taken in an arrangement direction of the projections, a cross-sectional shape of the projections satisfies the following expression:

$Z = X^2 / (R + \sqrt{(R^2 - (1+K)X^2)})$ where R is a radius of curvature [μm] of a top apex, and K is a conic constant.

20. The optical sheet according to claim 11, wherein: the projections have a high-order aspheric surface; and when a z axis is taken parallel to a normal direction of the optical sheet, and an X axis is taken in an arrangement direction of the projections, a cross-sectional shape of the projections satisfies the following expression:

$Z = X^2 / (R + \sqrt{(R^2 - (1+K)X^2)}) + AX^4 + BX^5 + CX^6 + \ldots$ where R is a radius of curvature [μm] of a top apex, K is a conic constant, and A, B, C ... are aspheric coefficients.

21. The optical sheet according to claim 11, further comprising projections provided on the other principal surface of the optical sheet opposite to the principal surface on which the projections are provided,
wherein the projections are provided so that a haze of the optical sheet is not higher than 60% in a state where the irregularities are not formed.

22. The optical sheet according to claim 11, wherein an average inclination gradient of the surface on which the projections are provided is not larger than 0.25 rad.

23. The optical sheet according to claim 11, wherein an outer shape of the projections varies periodically or randomly.

24. The optical sheet according to claim 11, wherein the height of projections differs.

25. The optical sheet according to claim 11, wherein: the projections are prism members of a triangular cross-sectional shape; and
slope portions of the projections are formed at different inclination angles.

* * * * *